US012649238B2

(12) United States Patent
Kogo

(10) Patent No.: US 12,649,238 B2
(45) Date of Patent: Jun. 9, 2026

(54) MOTION PLAN DEVICE, MOTION PLAN METHOD, AND RECORDING MEDIUM

(71) Applicant: NEC Corporation, Tokyo (JP)

(72) Inventor: Takuma Kogo, Tokyo (JP)

(73) Assignee: NEC CORPORATION, Tokyo (JP)

( * ) Notice: Subject to any disclaimer, the term of this patent is extended or adjusted under 35 U.S.C. 154(b) by 35 days.

(21) Appl. No.: 18/277,893

(22) PCT Filed: Mar. 24, 2021

(86) PCT No.: PCT/JP2021/012275
§ 371 (c)(1),
(2) Date: Aug. 18, 2023

(87) PCT Pub. No.: WO2022/201365
PCT Pub. Date: Sep. 29, 2022

(65) Prior Publication Data
US 2024/0131710 A1     Apr. 25, 2024
US 2024/0227188 A9     Jul. 11, 2024

(51) Int. Cl.
B25J 9/16           (2006.01)

(52) U.S. Cl.
CPC ........... B25J 9/1666 (2013.01); B25J 9/1669 (2013.01)

(58) Field of Classification Search
CPC .............................. B25J 9/1666; B25J 9/1669
See application file for complete search history.

(56) References Cited

U.S. PATENT DOCUMENTS

| | | | |
|---|---|---|---|
| 2018/0001472 A1 | 1/2018 | Konidaris et al. | |
| 2018/0272535 A1 | 9/2018 | Ogawa et al. | |
| 2020/0130192 A1 | 4/2020 | Ogawa et al. | |
| 2021/0308865 A1* | 10/2021 | Lin | B25J 9/1651 |

(Continued)

FOREIGN PATENT DOCUMENTS

| | | |
|---|---|---|
| JP | 2013-184233 A | 9/2013 |
| JP | 2018-505788 A | 3/2018 |
| JP | 6707485 B2 | 6/2020 |

OTHER PUBLICATIONS

International Search Report for PCT Application No. PCT/JP2021/012275, mailed on Jun. 15, 2021.

(Continued)

*Primary Examiner* — Wade Miles
*Assistant Examiner* — Jerrod Irvin Davis
(74) *Attorney, Agent, or Firm* — Sughrue Mion, PLLC

(57)           ABSTRACT

A motion plan device 10X mainly includes a condition setting means 90X and a motion plan means 100X. The condition setting means 90X sets a first condition in which a robot performing a pick-and-place for one or more transport objects and the one or more transport objects are located inside movable region being a region where no collision with a collision avoidance necessary target occurs, and a second condition in which, while the robot is grasping and carrying the transport object, the movable region around the collision avoidance necessary target of the robot and the movable region around the collision avoidance necessary target of the transport object being carried match with each other. Next, the motion plan means 100X calculates a motion plan of the robot based on the first condition and the second condition.

9 Claims, 13 Drawing Sheets

(56)  References Cited

U.S. PATENT DOCUMENTS

2023/0150777 A1* 5/2023 Skyum ..................... B07C 5/02
700/245

OTHER PUBLICATIONS

Mizuho Katayama et al., "Fast LTL-Based Flexible Planning for Dual-Arm Manipulation", IEEE/RS International Conference on Intelligent Robots and System, pp. 6605-6612, 2020.
Marcio da Silva Arantes et al., "Collision-Free Encoding for Chance-Constrained Nonconvex Path Planning", IEEE Transactions on Robotics, vol. 35, No. 2, Apr. 2019.

* cited by examiner

1: ROBOT CONTROL SYSTEM

1a: ROBOT CONTROL SYSTEM

1b: ROBOT CONTROL SYSTEM

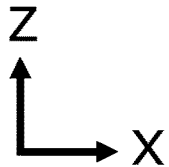
FIG. 10A
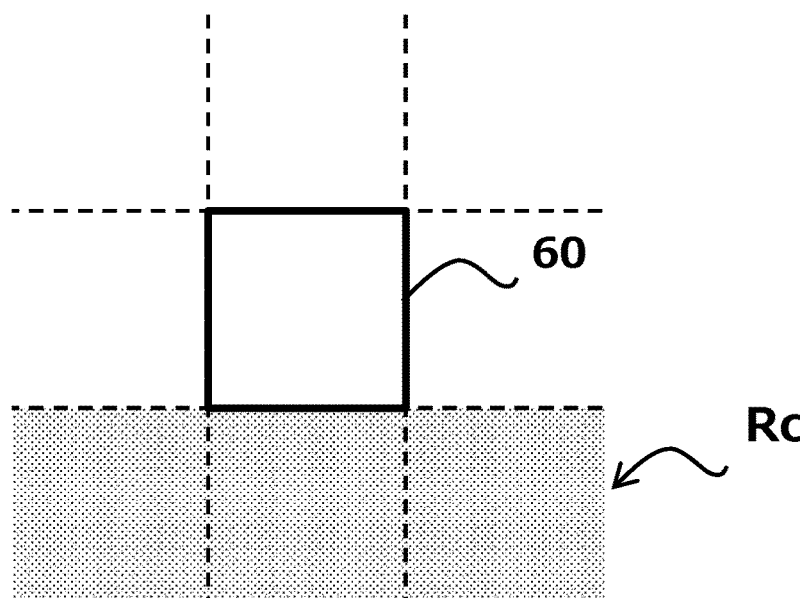
60
Rc
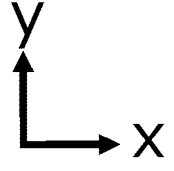
FIG. 10B
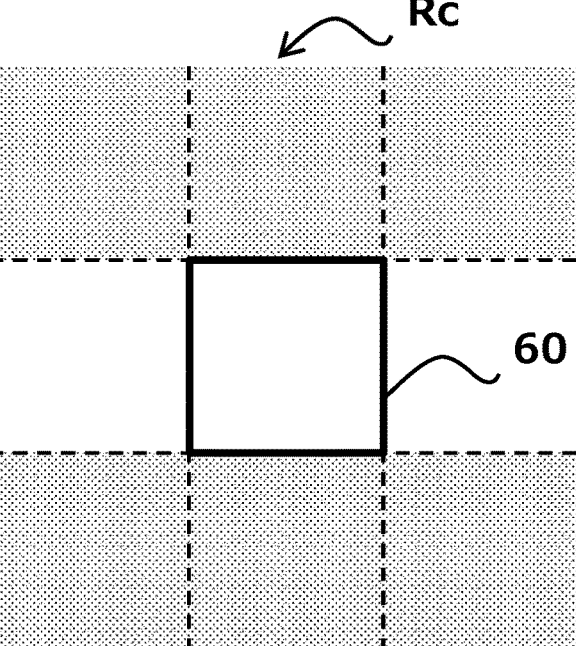
Rc
60

10X: MOTION PLAN DEVICE

15X — CONVERSION MEANS

16X — CONSTRAINT CONDITION ESTIMATION MEANS

MOTION PLAN DEVICE, MOTION PLAN METHOD, AND RECORDING MEDIUM

This application is a National Stage Entry of PCT/JP2021/012275 filed on Mar. 24, 2021, the contents of all of which are incorporated herein by reference, in their entirety.

TECHNICAL FIELD

The present disclosure relates to a motion plan device, a motion plan method, and a recording medium for calculating a motion plan of a robot.

BACKGROUND ART

There are factories and warehouses where a pick-and-place of an object (hereafter referred to as a "transport object") is automated by using a robot. The pick-and-place is a series of actions in which the transport object is picked up at a predetermined position, conveyed, and placed at another predetermined position.

A system disclosed in Non-Patent Document 1 calculates a motion plan in which each of the two arms of a dual-arm robot performs a pick-and-place action on a plurality of transport objects at the same time. More specifically, the system disclosed in Non-Patent Document 1 has an optimization model in which the dynamics of the robot and transport objects and a logic for determining whether pick-and-place has been completed for each transport object are formulated as a mixed integer linear programming problem, and outputs a solution obtained by performing a calculation of a seeking solution on the optimization model as the motion plan.

A system disclosed in Non-Patent Document 2 calculates a path plan in which a mobile robot such as a UAV (Unmanned Aerial Vehicles) moves to a destination while avoiding each obstacle. More specifically, the system disclosed in Non-Patent Document 2 includes an optimization model, which is formulated as a mixed integer linear programming problem and includes a constraint condition to select a region where the mobile robot does not collide with the obstacle as a travel path from a group of regions around an obstacle, and outputs a solution obtained by performing the calculation of the seeking solution on the optimization model as the path plan.

PRECEDING TECHNICAL REFERENCES

Patent Document

Non-Patent Document 1: M. Katayama et al, "Fast LTL-Based Flexible Planning for Dual-Arm Manipulation", IEEE/RS International Conference on Intelligent Robots and System, pp. 6605-6612, 2020.
Non-Patent Document 2: M. Arantes et al, "Collision-Free Encoding for Chance-Constrained Nonconvex Path Planning", IEEE Transactions on Robotics, vol. 35, No. 2, April, 2019.

SUMMARY

Problem to be Solved by the Invention

In a case of calculating a motion plan of a pick-and-place which considers a collision avoidance based on Non-Patent Document 1 and Non-Patent Document 2, since a calculation volume explodes as the number of transport objects increases, a practical application is difficult.

It is one object of the present disclosure to provide a motion plan device, a motion plan method, and a storage medium which can suitably calculate a motion plan of a pick-and-place in consideration of a collision avoidance, in order to solve the above-mentioned problems.

Means for Solving the Problem

According to an example aspect of the present disclosure, there is provided a motion plan device including:
a condition setting means configured to set a first condition in which a robot performing a pick-and-place for one or more transport objects and the one or more transport objects are located inside movable regions each being a region where no collision with a collision avoidance necessary target occurs, and a second condition in which, while the robot is grasping and carrying the transport object, the movable region around the collision avoidance necessary target of the robot and the movable region around the collision avoidance necessary target of the transport object being carried by the robot match with each other; and
a motion plan means configured to calculate a motion plan of the robot based on the first condition and the second condition.

According to another example aspect of the present disclosure, there is provided a motion plan method including:
setting a first condition in which a robot performing a pick-and-place for one or more transport objects and the one or more transport objects are located inside movable regions each being a region where no collision with a collision avoidance necessary target occurs, and a second condition in which, while the robot is grasping and carrying the transport object, the movable region around the collision avoidance necessary target of the robot and the movable region around the collision avoidance necessary target of the transport object being carried by the robot match with each other; and
calculating a motion plan of the robot based on the first condition and the second condition.

According to a further example aspect of the present disclosure, there is provided a medium storing a program, the program causing a computer to perform a process including:
setting a first condition in which a robot performing a pick-and-place for one or more transport objects and the one or more transport objects are located inside movable regions each being a region where no collision with a collision avoidance necessary target occurs, and a second condition in which, while the robot is grasping and carrying the transport object, the movable region around the collision avoidance necessary target of the robot and the movable region around the collision avoidance necessary target of the transport object being carried by the robot match with each other; and
calculating a motion plan of the robot based on the first condition and the second condition.

Effect of the Invention

According to the present disclosure, it becomes possible to suitably calculate a motion plan of a pick-and-place in consideration of a collision avoidance.

BRIEF DESCRIPTION OF THE DRAWINGS

FIG. 10A is an x-z plan view illustrating an example of the movable region subject to a soft path constraint according to a second example embodiment, and FIG. 10B is the x-z plan view illustrating the example of the movable region subject to the soft path constraint according to the second example embodiment.

EXAMPLE EMBODIMENTS

Explanations of Problems

Figure 1:
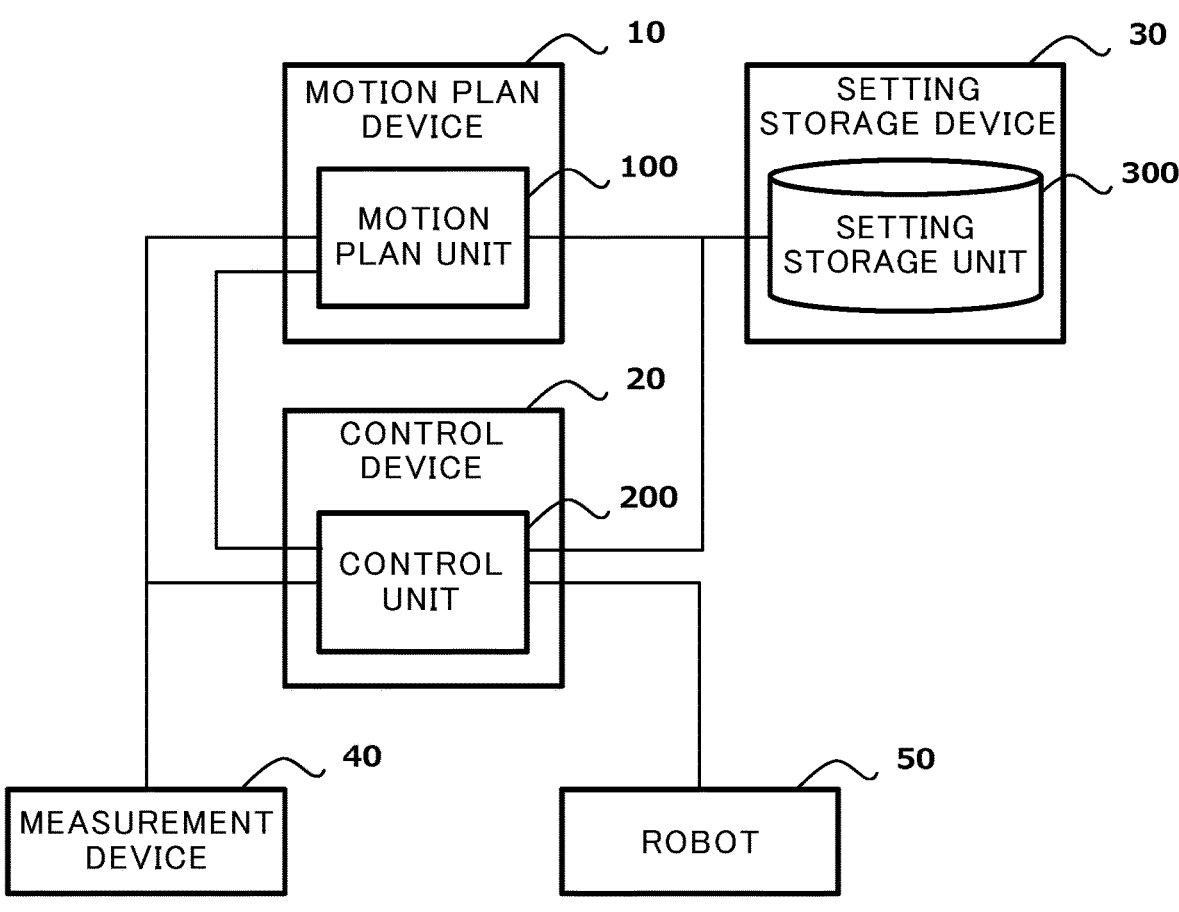
FIG. 1 is a schematic block diagram illustrating a first configuration example for a robot control system and a motion plan device according to a first example embodiment.

The inventor of the present disclosure found that in a case of calculating a motion plan of a pick-and-place in consideration to a collision avoidance based on Non-Patent Document 1 and Non-Patent Document 2, a calculation volume explosively increases as the number of transport objects increases, a practical application is difficult.

More precisely, this issue is that the motion plan is calculated by solving a mixed integer linear programming problem, but each of the number of binary variables and the number of constraint conditions for a big-M method, which make the calculation of a seeking solution difficult, increases as the number of transport objects increases. In a general mixed integer linear programming problem, binary variables are decision variables used to model a decision and a logic. Moreover, in the general mixed integer linear programming problem, the big-M method is a constraint formulation technique used to convert continuous values to binary values. The binary variables and the big-M method are used in collision avoidance with obstacles to relate position coordinates of a moving object (continuous value) to a determination of whether it is in a collision free region with the obstacles (binary values). In other words, the binary variables and the constraint conditions according to the big-M method are essential in avoiding a collision with the obstacles, and the binary variables and the constraint conditions according to the big-M method are necessary in avoiding the collision with each of the obstacles for the transport object.

More particularly, this issue is that since the transport object not grasped by the robot needs to be handled so as not to collide with other transport objects as well as with the obstacles and an end effector, the number of binary variables related to collision avoidance and the number of constraint conditions according to the big-M method, respectively, increase on the order of squared values as the number of the transport objects increases. As a result, the inventor found that "as the number of transport objects increases, there is an exponential increase of a computation time in seeking the motion plan".

The inventor has found this issue and has also derived a means to solve the issue. The inventor has found that by making a movable region of the transport object match a movable region of the end effector carrying the transport object when the object is being transported by the end effector, the number of binary variables pertaining to the collision avoidance can be reduced, and as a result, it is possible to realize a calculation with high time efficiency with respect to the motion plan of the pick-and-place in consideration to the collision avoidance. Here, "high time efficiency" refers to that the motion plan is calculated in less time for a comparable quality. Furthermore, the inventor found that by adding a soft constraint on a travel path of the transport object using characteristics of the travel path in the pick-and-place, the number of constraint conditions according to the big-M method for the collision avoidance can be substantially reduced, and as a result, it is possible to realize a calculation with high time efficiency with respect to the motion plan of the pick-and-place in consideration to the collision avoidance.

Hereinafter, example embodiments of a motion plan device, a motion plan method, and a recording medium will be described with reference to the drawings. The following example embodiments are not intended to limit the claimed invention. Moreover, not all of combinations of features described in the example embodiments are essential to the solution of the invention.

First Example Embodiment

Referring to FIG. 1, an example of a configuration of a robot control system 1 including a motion plan device 10 of a first example embodiment will be described in detail. FIG. 1 is a schematic block diagram illustrating a first configuration example of the robot control system 1 in the first example embodiment.

The robot control system 1 roughly includes the motion plan device 10, a control device 20, a setting storage device 30, a measurement device 40, and a robot 50. The motion plan device 10 includes a motion plan unit 100. The control device 20 includes a control unit 200. The setting storage device 30 includes a setting storage unit 300.

The motion plan device 10 is communicably connected to the control device 20, the setting storage device 30, and the measurement device 40 through a communication line. Moreover, the control device 20 is communicatively connected to the setting storage device 30, the measurement device 40, and the robot 50 through a communication line. The communication line may be, for instance, a dedicated line, the Internet, a VPN (Virtual Private Network), a LAN (Local Area Network), a USB (Universal Serial Bus), a Wi-Fi, and a Bluetooth. Note that the communication line may be formed in any form, regardless of a physical form of the communication line such as an occupied form, a wired line, a wireless line of the communication line.

The motion plan device 10 calculates motion plan information to realize a desired pick-and-place. More specifically, the motion plan unit 100 reads plan setting information from the setting storage unit 300, reads measurement information from the measurement device 40, and calculates the motion plan information using the read information. The motion plan unit 100 transmits the calculated motion plan information to the control unit 200. The motion plan information is formed by trajectory information representing where a representative point of the robot 50 is located at which time, and action information representing which action the robot 50 performs at which time. Here, the action of the robot 50 corresponds to, specifically, a pick action or a place action of the transport object, and corresponds to an action of the robot 50 including not only a mere movement action but also a control of the end effector. Details of the calculation method of the motion plan information, the trajectory information, the action information, the plan setting information, and the measurement information will be described later. The motion plan device 10 may be implemented, for instance, on a computer such as a personal computer, a workstation, or the like.

The control device 20 calculates control command information for controlling the robot 50 to realize the motion plan calculated by the motion plan unit 100, and transmits the calculated control command information to the robot 50. More specifically, the control unit 200 reads control setting information from the setting storage unit 300, the measurement information from the measurement device 40, robot status information from the robot 50, and the motion plan information from the motion plan unit 100. The control unit 200 calculates the control command information of the robot 50 using the read information, and transmits the calculated control command information to the robot 50. When calculating the control command information, the control unit 200 converts the trajectory information and the action information in order to correspond to the output of each drive of the robot 50, while simultaneously interpolating it in time and performing an up-sampling conversion to achieve a higher temporal resolution than the motion plan information. Robot state information includes, for instance, a state (a position, an angle, or the like) of each driving unit of the robot and a progress state of a control sequence for each driving unit of the robot. The control setting information includes, for instance, information indicating a maximum value and a minimum value of an output of each driving unit of the robot. The control device 20 is implemented, for instance, by a computer such as a personal computer, a workstation, or the like.

The setting storage unit 300 of the setting storage device 30 stores the plan setting information and the control setting information. The plan setting information and the control setting information may be information generated by user input through a user interface. The user interface is a computer such as a personal computer, a workstation, a tablet, a smartphone, or an input device such as a keyboard, a mouse, a touch panel display, and a voice input device. However, the user interface is not limited to these examples. The setting storage device 30 may be implemented, for instance, on the computer such as the personal computer, the workstation, or the like.

The measurement device 40 senses and estimates a position and a posture of the transport object, and outputs the sensing and estimation results as the measurement information. The measurement device 40 is, for instance, a sensing device such as a stereo camera, a pattern projection camera, or a LIDAR (Laser Imaging Detection and Ranging), or a sensing system in which the sensing device and a post-processing device for estimating the position and the posture of a target object are integrated. However, the measurement device 40 is not limited to these examples, it may be configured to include various external sensors.

The robot 50 is a robot which is driven in accordance to the control command information, and is capable of grasping and moving the transport object to a predetermined destination, such as an articulated robot, a dual-armed robot, a SCARA type robot, a parallel robot, or the like. An end portion of the robot 50 is provided with the end effector which is a device for gripping the transport object, and the end effector is, for instance, a 2-jaw gripper, a 3-jaw gripper, a vacuum suction hand, a magnetic suction hand, and a general-purpose hand, or the like. The robot 50 and the end effector are not limited to these examples and may have various configurations.

Figure 2:
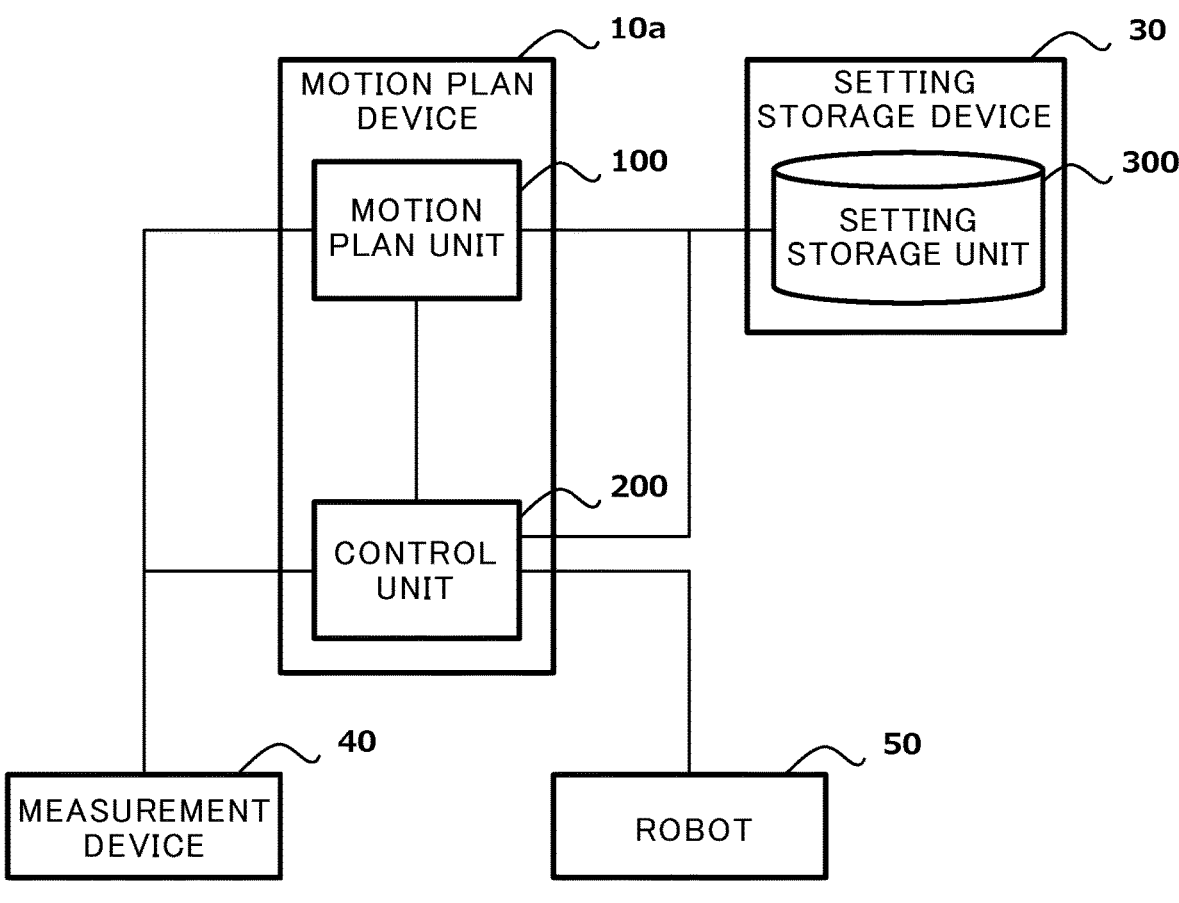
FIG. 2 is a schematic block diagram illustrating a second configuration example for the robot control system and the motion plan device according to the first example embodiment.
Figure 3:
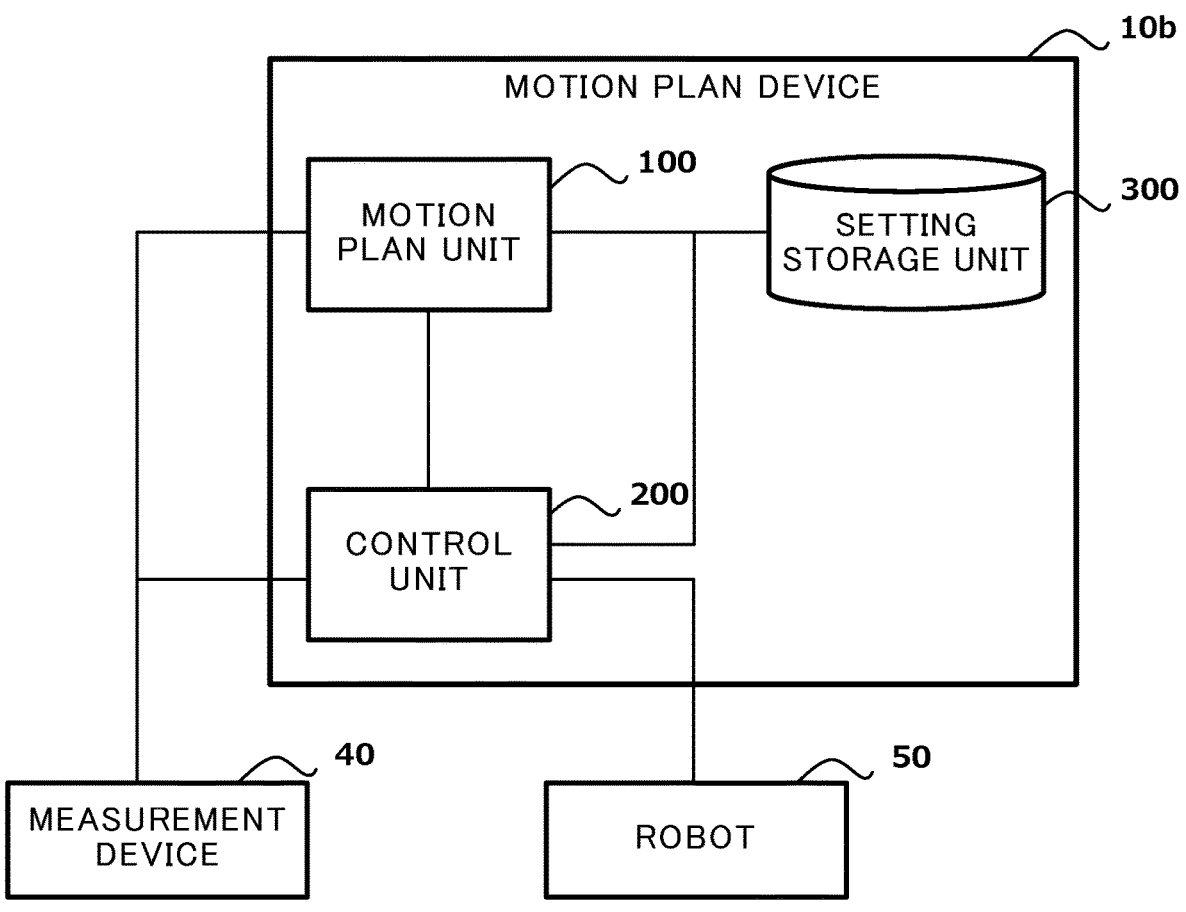
FIG. 3 is a schematic block diagram illustrating a third configuration example for the robot control system and the motion plan device according to the first example embodiment.

The robot control system 1 is not limited to the configuration illustrated in FIG. 1, and various changes may be made. FIG. 2 is a schematic block diagram of a robot control system 1a according to a second configuration of the first example embodiment. In the second configuration example illustrated in FIG. 2, a motion plan device 10a includes the control unit 200, and transmits the control command information directly to the robot 50. FIG. 3 is a schematic block diagram of a robot control system 1b according to a third configuration of the first example embodiment. In the third configuration example illustrated in FIG. 3, a motion plan device 10b includes the control unit 200 and the setting storage unit 300, directly transmits the control command information to the robot 50, and also stores the plan setting information and the control setting information.

Figure 4:
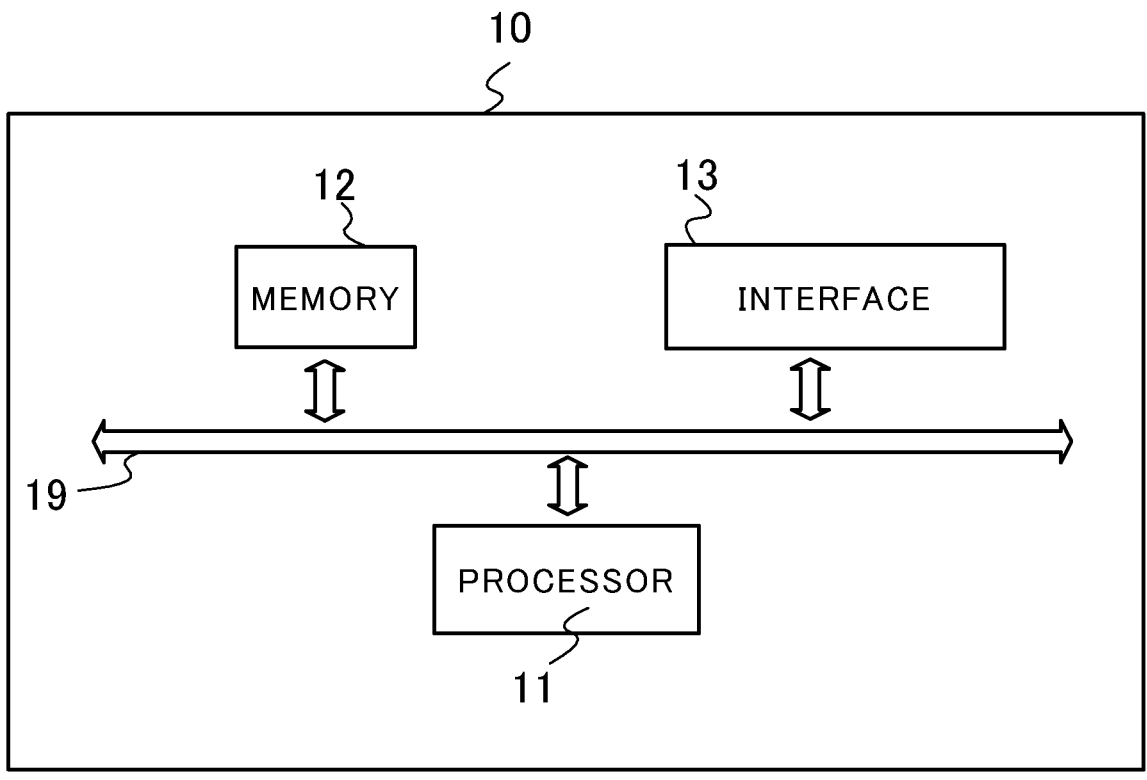
FIG. 4 illustrates an example of a hardware configuration of the motion plan device according to the first example embodiment.

FIG. 4 illustrates an example of a hardware configuration of the motion plan device 10. The motion plan device 10 includes a processor 11, a memory 12, and an interface 13 as hardware. The processor 11, the memory 12, and the interface 13 are connected via a data bus 19.

The processor 11 functions as a controller (arithmetic unit) for controlling the entire motion plan device 10 by executing programs stored in the memory 12. The processor 11 is, for instance, a CPU (Central Processing Unit), a GPU (Graphics Processing Unit), a TPU (Tensor Processing Unit) or the like. The processor 11 may correspond to a plurality of processors. The processor 11 is an example of a computer. The processor 11 functions as, for instance, the motion plan unit 100 in the motion plan device 10 illustrated in FIG. 1 or the motion plan unit 100 and the control unit 200 in the motion plan devices 10a and 10b respectively illustrated in FIG. 2 and FIG. 3.

The memory 12 is formed by a variety of volatile and non-volatile memories such as a RAM (Random Access Memory), a ROM (Read Only Memory), a flash memory, and the like. Moreover, programs for executing processes executed by the motion plan device 10 are stored in the memory 12. Note that a part of the information to be stored in the memory 12 may be stored by one or more external storage devices capable of communicating with the motion plan device 10, and may be stored by a removable recording medium for the motion plan device 10. The memory 12 functions as the setting storage unit 300 in the motion plan device 10b depicted in FIG. 3, for instance.

The interface 13 is an interface for electrically connecting the motion plan device 10 with other devices (the control device 20, the setting storage device 30, the measurement device 40, and the robot 50). The interface 13 may be a wireless interface such as a network adapter for wirelessly transmitting and receiving data to and from the other devices, or may be a hardware interface for connecting with the other devices by cables or the like. Note that each of the motion plan device 10a depicted in FIG. 2 and the motion plan device 10b depicted in FIG. 3 also includes the hardware configuration depicted in FIG. 4.

Figure 5:
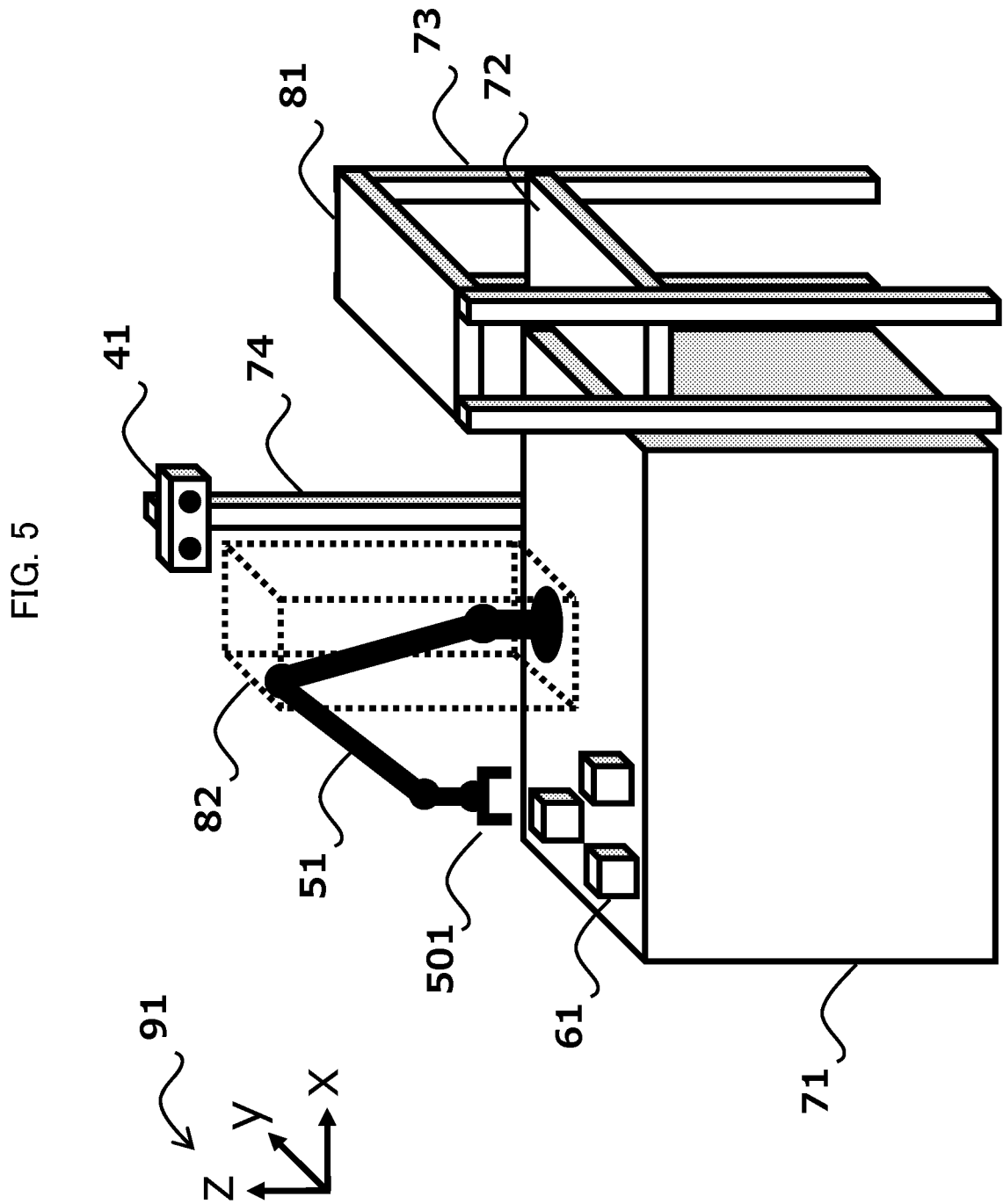
FIG. 5 is an example of a hardware configuration of the robot control system according to the first example embodiment.

FIG. 5 is an example of a hardware configuration of the robot control system 1. An articulated robot 51 is mounted on a worktable 71. A 2-jaw gripper 501 is attached to a tip of the articulated robot 51 as the end effector. A position and posture estimation camera system 41 is mounted on a support pole 74 on a side of the worktable 71. The position and posture estimation camera system 41 measures and estimates the position and posture of transport objects 61 placed on the worktable 71. Each transport object 61 is picked and placed by the articulated robot 51 to transit from a state in which the transport object 61 is placed on the worktable 71 to a state in which the transport object 61 is placed on a shelf board 72 or on a shelf board 81 of a shelf, which is formed by the shelf board 72, the shelf board 81, and shelf poles 73, and is placed beside the worktable 71. A virtual obstacle 82 is an obstacle without a physical substance and is set as a region which the end effector 501 is not allowed to enter. Here, the virtual obstacle 82 is provided to prevent the articulated robot 51 from contacting itself. In FIG. 5, the motion plan device 10, the control device 20, and the setting storage device 30 are not explicitly illustrated, but these devices are installed beside, inside, or away from the worktable 71. A world coordinate system 91 represents axes of the world coordinates of the robot control system 1 in FIG. 5. Here, as an example, an x-axis and a y-axis are provided along a horizontal direction, and a z-axis is provided along a height direction.

Next, calculation (generation) methods of the plan setting information, the motion plan information, and the measurement information which are used by the motion plan unit 100 will be described with reference to FIG. 5. First, the calculation method of the motion plan information is explained, and then the calculation methods are explained in the order of the plan setting information and the measurement information.

The motion plan unit 100 calculates the motion plan information using the optimization model which formulates a series of the pick-and-place into the mixed integer linear programming problem. More specifically, after the optimization model is generated, the motion plan unit 100 performs a series of processes in which a calculation of a seeking solution for the optimization model is performed using an optimization solver to calculate a solution of the optimization model, and finally, the post-processing is conducted with respect to the obtained solution to be converted into the motion plan information.

The optimization solver can be any solver capable of solving the mixed integer linear programming problem. For instance, a branch and bound method using continuous relaxation and linear programming, or a branch and bound method combined with a resection plane method, a local search method, a meta-heuristics, or the like is preferred, but not limited to these examples.

The optimization model includes an objective function which minimizes the number of time steps in which the pick-and-place is completed for all target transfer objects and also minimizes a travel distance of the end effector. The objective function is not limited to this example, but may be any one which provides the desired pick-and-place. For instance, the objective function may be an objective function which minimizes only one of the number of time steps and the travel distance by the end effector which are described above.

Moreover, the optimization model also includes the constraint condition which models dynamics of the end effector and the transport object with respect to respective movements as a hybrid system. This constraint models a fact that the transport object moves in unison with the end effector when the transport object is grasped and transported by the end effector, while the transport object remains in the same position without moving when the transport object is not grasped by the end effector.

In addition, the optimization model includes the constraint condition modeled for the collision avoidance between the end effector and each obstacle, between the transport object and the obstacle, between the end effector and the transport object, and between the transport object and other transport objects. This constraint condition is a condition which the collision avoidance object such as the end effector and a collision avoidance necessary target such as the obstacle (a target with which the collision avoidance object needs to avoid a collision) need to satisfy, and models a condition under which the collision avoidance object moves through a predefined movable region around the collision avoidance necessary target without colliding with the collision avoidance necessary target.

Besides, the optimization model includes necessary constraint conditions auxiliary to a formulation of the objective function and constraint conditions described above.

A more detailed example is given for the optimization model described above. In this optimization model, for the articulated robot, only an end effector portion is subject of modeling. It is also assumed that the movable region of the end effector 501 can be set by a user so as to minimize the necessary number of objects to be defined as obstacles which are to be avoided as collisions. For instance, in the hardware configuration in FIG. 5, the worktable 71, the shelf board 72, the shelf poles 73, the support pole 74, and the position and posture estimation camera system 41 are set not to be positioned inside the movable region of the end effector 501, so that the obstacles to avoid collisions can be limited to the shelf board 81 and the virtual obstacle 82. Moreover, the end effector, the transport objects, the obstacle, the movable region of the end effector, and the movable region around the collision avoidance object which are to be modeled as an axis aligned bounding box (AABB: Axis Aligned Bounding Box). The positions of the end effector, the transport objects, and the obstacle are centers of gravity of corresponding rectangular bodies, respectively. Supposed that the end effector approaches and grips each transport object from a front of the transport object, and a lower surface of the end effector and an upper surface of the transport object are to be in contact in a carrying state.

In addition, constants, coefficients, variables, symbols, and notations illustrated in following items (a) to (k) are used in an example of this optimization model. For binary variables, respective states corresponding to values 0 and 1 are indicated in parentheses. Whenever these symbols and the like are used in the text below, the subscript indexes are omitted for brevity of presentation.

(a) Auxiliary Variable: Index Number

[Math 1]

t: Time step number is Dimension number m, k: Transport object number l: Obstacle number r: Movable region number (b) Constants and Coefficients: Numbers

[Math 2]

$N_{stp}$: Number of time steps $N_{dim}$: Number of dimensions $N_{dlv}$: Number of transport objects $N_{obs}$: Number of obstacles $N_{rgn}$: Number of movable regions (c) Constants and Coefficients: Initial Values and Target Value

[Math 3]

$p_i^{ee,int}$:

Initial value of i component in position of end effector $v_i^{ee,int}$:

Initial value of i component in velocity of end effector $p_{m,i}^{dlv,int}$:

Initial value of i component in position of transport object m $p_{m,i}^{dlv,dst}$:

Target value of i component in position of transport object m $p_{l,i}^{obs,int}$:

Initial value of i component in position of obstacle l (d) Constants and Coefficients: Maximum Value and Minimum Value

[Math 4]

$p_i^{ee,max}$:

Maximum value of i component in position of end effector $p_i^{ee,min}$:

Minimum value of i component in position of end effector $v_i^{ee,max}$:

Maximum value of i component in velocity of end effector $v_i^{ee,min}$:

Minimum value of i component in velocity of end effector $p_{m,i}^{dlv,max}$:

Maximum value of i component in position of transport object m $p_{m,i}^{dlv,min}$:

Minimum value of i component in position of transport object m $p_{l,r,i}^{obs,max}$:

Maximum value of i component in position of movable region r around obstacle l $p_{l,r,i}^{obs,min}$:

Minimum value of i component in position of movable region r around obstacle l $p_{m,r,i}^{dlv,rgn,max}$:

Maximum value of i component in position of movable region r around transport object $p_{m,r,i}^{dlv,rgn,min}$:

Minimum value of i component in position of movable region r around transport object m (e) Constants and Coefficients: Shape

[Math 5]

$$s_i^{ee}:$$

value of i component of length of end effector $$s_{m,i}^{div}:$$

value of i component of length of transport object m $$s_{l,i}^{obs}:$$

value of i component of length of obstacle l (f) Constant/Coefficient: Distance

[Math 6]

$$b_{m,i}^{on}:$$

Value of i component in distance between gravity centers of end effector and transport object m in the carrying state $$b_{m,i}^{off}:$$

Value of i component in distance between gravity centers of end effector and transport object m in grasping start state and grasping end state $$b_m^{mgn}:$$

Margin in distance between gravity centers of end effector and the transport object m in grasp start state and grasp end state (g) Constants and Coefficients: Others

[Math 7]

Δ: Time step interval

M: Sufficiently large positive real number

ε: Sufficiently small positive real number (h) Decision Variables: Binary Values

[Math 8]

$\theta_{m,t}$: Grasping state (0: not grasped, 1: grasped) of transport object m at time step t $\varphi_{m,t}$: Target position reach state (0: not reached, 1: reached) of transport object m at time step t $$\Phi_{l,r,t}^{ee,obs}:$$

Whether end effector is located in movable region r around obstacle l at time step t (0: outside region, 1: inside region)

$$\Phi_{m,r,t}^{ee,div}:$$

Whether end effector is located in movable region r around transport object m at time step t (0: outside region, 1: inside region)

(i) Decision Variable: Continuous Value

[Math 9]

$$p_{i,t}^{ee}:$$

Value of i component of position of end effector at time step t $$v_{i,t}^{ee}:$$

Value of i component of velocity of end effector at time step t $$v_{i,t}^{ee}:$$

Slack variable for realizing L1 norm of $$v_{n,i,t}^{ee}$$

$$p_{i,t}^{ee}:$$

Value of time step of i component of position of transport object m

[Math 10]

$$\theta_{m,t}^{pck}:$$

Grasping start state of end effector and transport object m at time step t (0: not started to grasp, 1: in starting of grasping)

$$\theta_{m,t}^{cry}:$$

Carrying state of end effector and transport object m at time step t (0: Not in transport, 1: in carrying)

$$\theta_{m,t}^{plc}:$$

Grasping end state of end effector and transport object m at time step t (0: not ended grasping, 1: in ending of grasping)

13

[Math 11]

$$\Phi_{m,l,r,t}^{div,obs}:$$

Whether transport object m is located in movable region r around obstacle l at time step t (0: outside region, 1: inside region)

$$\Phi_{m,k,r,t}^{div,div}:$$

Whether transport object m is located in movable region r around transport object k at time step t (0: outside region, 1: inside region)

$C_t$: Completion state of pick-and-place for all transport objects at time step t (0: Not completed, 1: Completed)

(j) Symbols

[Math 12]

$\bigvee$: OR operator $\bigwedge$: AND operator $\neg$: NOT operator (k) Notation

[Math 13]

X: Vector having all decision variables as elements x*: Optimal value of decision variable x
which optimizes (here minimizes) objective function A formulation of each symbol into a constraint condition that is an equivalence in the mixed integer linear programming problem is represented by the following expressions (1) through (3).

[Math 14]

$$y = \neg x \Leftrightarrow y = 1 - x \tag{1}$$

$$y = \bigvee_{n=1,\dots,N} x_n \Leftrightarrow y \leq \sum_n x_n, y \geq x_n n = 1, \dots, N \tag{2}$$

$$y = \bigwedge_{n=1,\dots,N} x_n \Leftrightarrow y \geq \sum_n x_n - N + 1, y \leq x_n n = 1, \dots, N \tag{3}$$

Respective possible values of auxiliary variables representing index numbers are represented by expressions (4) to (8).

[Math 15]

$$t \in \{0,1, \dots ,N_{stp}\} \tag{4}$$

$$i \in \{1, \dots ,N_{dim}\} \tag{5}$$

$$m,k \in \{1, \dots ,N_{div}\} \tag{6}$$

$$l \in \{1, \dots ,N_{obs}\} \tag{7}$$

$$r \in \{1, \dots ,N_{rgm}\} \tag{8}$$

Constraint conditions concerning a maximum value range and a minimum value range for each continuous variable are represented by expressions (9) to (18). An expression (9) represents the movable region of the end effector.

14

[Math 16]

$$p_i^{ee,min} \leq p_{i,t}^{ee} \leq p_i^{ee,max} \ \forall i, t \tag{9}$$

$$v_i^{ee,min} \leq v_{i,t}^{ee} \leq v_i^{ee,max} \ \forall i, t \tag{10}$$

$$p_{m,i}^{div,min} \leq p_{m,i,t}^{div} \leq p_{m,i}^{div,max} \ \forall m, i, t \tag{11}$$

$$0 \leq v_{i,t}^{ee} \ \forall i, t \tag{12}$$

[Math 17]

$$0 \leq \theta_{m,t}^{pck} \leq 1 \ \forall m, t \tag{13}$$

$$0 \leq \theta_{m,t}^{cry} \leq 1 \ \forall m, t \tag{14}$$

$$0 \leq \theta_{m,t}^{plc} \leq 1 \ \forall m, t \tag{15}$$

$$0 \leq \phi_{m,l,r,t}^{div,obs} \leq 1 \ \forall m, l, r, t \tag{16}$$

$$0 \leq \phi_{m,k,r,t}^{div,div} \leq 1 \ \forall m, k, r, t \tag{17}$$

$$0 \leq C_t \leq 1 \ \forall t > 0 \tag{18}$$

Constraint conditions concerning initial values for the position and the velocity of the end effector and an initial value of the position of the transport object are represented by expressions (19) to (21).

[Math 18]

$$p_{i,0}^{ee} = p_i^{ee,init} \ \forall i \tag{19}$$

$$v_{i,0}^{ee} = v_i^{ee,init} \ \forall i \tag{20}$$

$$p_{m,i,0}^{div} = p_{m,i}^{div,init} \ \forall m, i \tag{21}$$

A constraint condition that "no more than two transport objects may be in the grasping state at the same time" is represented by an expression (22).

[Math 19]

$$\sum_m \theta_{m,t} \leq 1 \forall t \tag{22}$$

A constraint condition that "the grasping start state by the end effector of the transport object matches a transition from a non-transported state to a carrying state" is represented by an expression (23). The grasping start state corresponds to a series of action states in which the end effector performs a pick action for the transport object from an approach point and returns to the approach point after the pick action.

[Math 20]

$$\theta_{m,t}^{pck} = (\neg \theta_{m,t}^{cry}) \wedge \theta_{m,t+1}^{cry} \ \forall m, t < N_{stp} \tag{23}$$

A constraint condition that "the grasping start state by the end effector of the transport object matches with a transition from the carrying state to the non-transported state" is represented by an expression (24). The grasping end state is a series of action states in which the end effector performs a place action for the transport object from the approach point and returns to the approach point after the place action.

[Math 21]

$$\theta_{m,t}^{plc} = (\neg\, \theta_{m,t}^{cry}) \wedge \theta_{m,t-1}^{cry} \; \forall\, m,\, t > 0 \tag{24}$$

A constraint condition that "the carrying state of the transport object by the end effector is the grasping state excluding the grasping start state" is represented by an expression (25). In other words, the grasping state corresponds to the grasping start state or the carrying state.

[Math 22]

$$\theta_{m,t}^{cry} = \theta_{m,t} - \theta_{m,t}^{pck} \forall\, m,\, t \tag{25}$$

A constraint condition that "the initial values of the grasping start state, the grasping end state, and the transfer state of the transport object are 0" is represented by an expression 26.

[Math 23]

$$\theta_{m,0}^{pck} = \theta_{m,0}^{plc} = \theta_{m,0}^{cry} = 0 \forall\, m \tag{26}$$

A constraint condition that "the position of the end effecter is updated by a position and a velocity of the end effecter at one time step earlier" is represented by an expression (27).

[Math 24]

$$p_{i,t}^{ee} = p_{i,t-1}^{ee} + \Delta v_{i,t-1}^{ee} \forall\, i,\, t > 0 \tag{27}$$

A constraint condition that "the position of the transport object in a non-grasped state matches with a position of the transport object one at one time step earlier" is represented by expressions (28) and (29).

[Math 25]

$$p_{m,i,t}^{div} - p_{m,i,t-1}^{div} \leq M\theta_{m,t-1} \forall\, m,\, i,\, t > 0 \tag{28}$$

$$p_{m,i,t}^{div} - p_{m,i,t-1}^{div} \geq -M\theta_{m,t-1} \forall\, m,\, i,\, t > 0 \tag{29}$$

A constraint condition that "a position of the transport object in the carrying state matches the position of the end effector at a certain distance away from the end effector position" is represented by an expression (30) and an expression (31).

[Math 26]

$$p_{m,i,t}^{div} - p_{i,t}^{ee} + b_{m,i}^{on} \leq M(\neg\, \theta_{m,t}^{cry}) \forall\, m,\, i,\, t \tag{30}$$

$$p_{m,i,t}^{div} - p_{i,t}^{ee} + b_{m,i}^{on} \geq -M(\neg\, \theta_{m,t}^{cry}) \forall\, m,\, i,\, t \tag{31}$$

Here, a position where the end effector and the transport object are separated by a certain distance corresponds to a position where the end effector and the transport object are in close contact due to grasping. $b^n$ denotes a distance between the end effector and the transport object in the carrying state, and is determined by an expression (54), which is described below.

A constraint condition that "the position of the transport object at the start and end of grasping matches the position at a certain distance apart" is represented by an expression (32) and an expression (33).

[Math 27]

$$-M\left(\neg\, \theta_{m,t}^{pck}\right) \leq p_{m,i,t}^{div} - p_{i,t}^{ee} + b_{m,i}^{off} \leq M\left(\neg\, \theta_{m,t}^{pck}\right) \forall\, m,\, i,\, t \tag{32}$$

$$-M\left(\neg\, \theta_{m,t}^{plc}\right) \leq p_{m,i,t}^{div} - p_{i,t}^{ee} + b_{m,i}^{off} \leq M\left(\neg\, \theta_{m,t}^{plc}\right) \forall\, m,\, i,\, t \tag{33}$$

Here, the position apart by a certain distance is the approach position before the end effector picks the transport object in the grasping start state, and is a return position after the end effector places the transport object in the grasping end state. $b^{ff}$ denotes a distance between the end effector and the transport object in each of the grasp start state and the grasp end state, and is defined by an expression (55) to be described later.

A constraint condition that "the target position arrival state of the transport object corresponds to that the position of the transport object matches a target value" is represented by an expression (34) and an expression (35). In the following, it is assumed that the "target position" refers to a target value of the position (that is, coordinates of the target position).

[Math 28]

$$p_{m,i,t}^{div} - p_{m,i}^{div,dst} \leq M(\neg\, \varphi_{m,t}) \forall\, m,\, i,\, t \tag{34}$$

$$p_{m,i,t}^{div} - p_{m,i}^{div,dst} \geq -M(\neg\, \varphi_{m,t}) \forall\, m,\, i,\, t \tag{35}$$

A constraint condition that "the target position can be reached only when the transport object is in the non-grasped state" is represented by an expression 36.

[Math 29]

$$\varphi_{m,t} \leq \neg\theta_{m,t} \; \forall m,t \tag{36}$$

A constraint condition that "the completion state of the pick-and-place is that all transport objects are at the target position reach state over all future time steps from a current time step" is represented by an expression (37).

[Math 30]

$$C_t = \bigwedge_{\tau=t,\ldots,N_{stp}} \bigwedge_m \varphi_{m,\tau} \forall\, m,\, t \tag{37}$$

A constraint condition that "a final state is the completion state of the pick-and-place" is represented by an expression 38.

[Math 31]

$$C_{N_{stp}} = 1 \tag{38}$$

Subsequently, before describing constraint conditions concerning the movable region, the movable region will be described with reference to FIG. 6A to FIG. 6C and FIG. 7A to FIG. 7C.

Figures 6A, 6B, 6C:
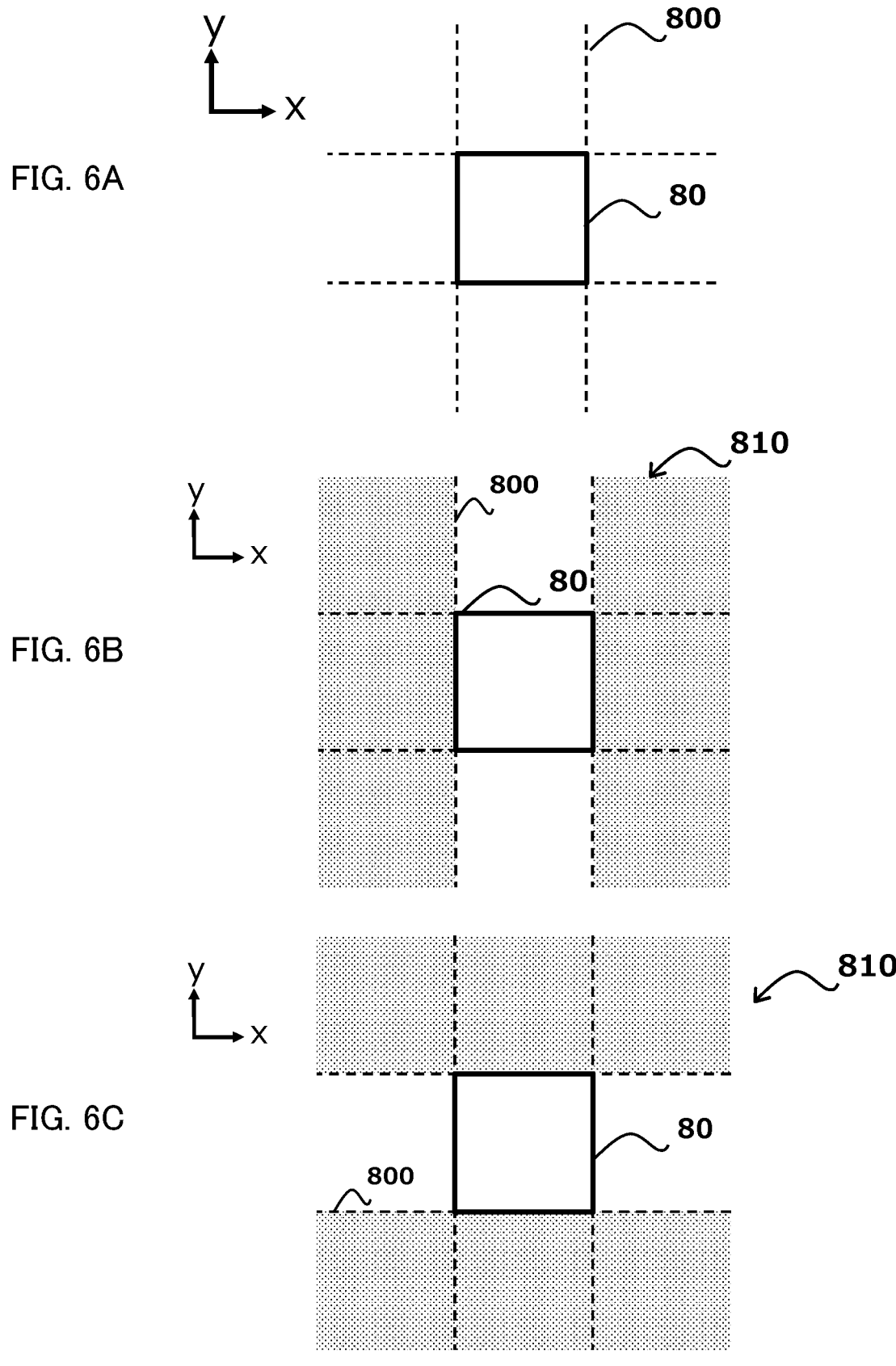
FIG. 6A is an x-y plan view depicting a movable region around an obstacle.
FIG. 6B illustrates a first example of the movable region.
FIG. 6C illustrates a second example of the movable region.

FIG. 6A to FIG. 6C are x-y plan views illustrating the movable region around an obstacle 80. FIG. 6A illustrates a virtual surface 800 along each surface of the obstacle 80 modeled by a rectangular cube. The movable region may be modeled as an axis-aligned bounding box (AABB). FIG. 6B illustrates a first example of a movable region 810, and FIG. 6C is a x-y plan view illustrating a second example of the movable region 810. In FIG. 6B and FIG. 6C, the movable region 810 is hatched. As illustrated in FIG. 6B and FIG. 6C, the movable region 810 is a region delimited by the virtual surface 800, specifically, corresponds to a half space outside the virtual surface 800. In the case of a three-dimensional space, the movable region around the collision avoidance necessary target (here, the obstacle 80) is represented by regions of six half-spaces corresponding to six virtual surfaces 800. Note that the movable region 810 is actually a finite region represented by a product set with the movable region of the collision avoidance object (end effector or transport object).

Figures 7A, 7B, 7C:
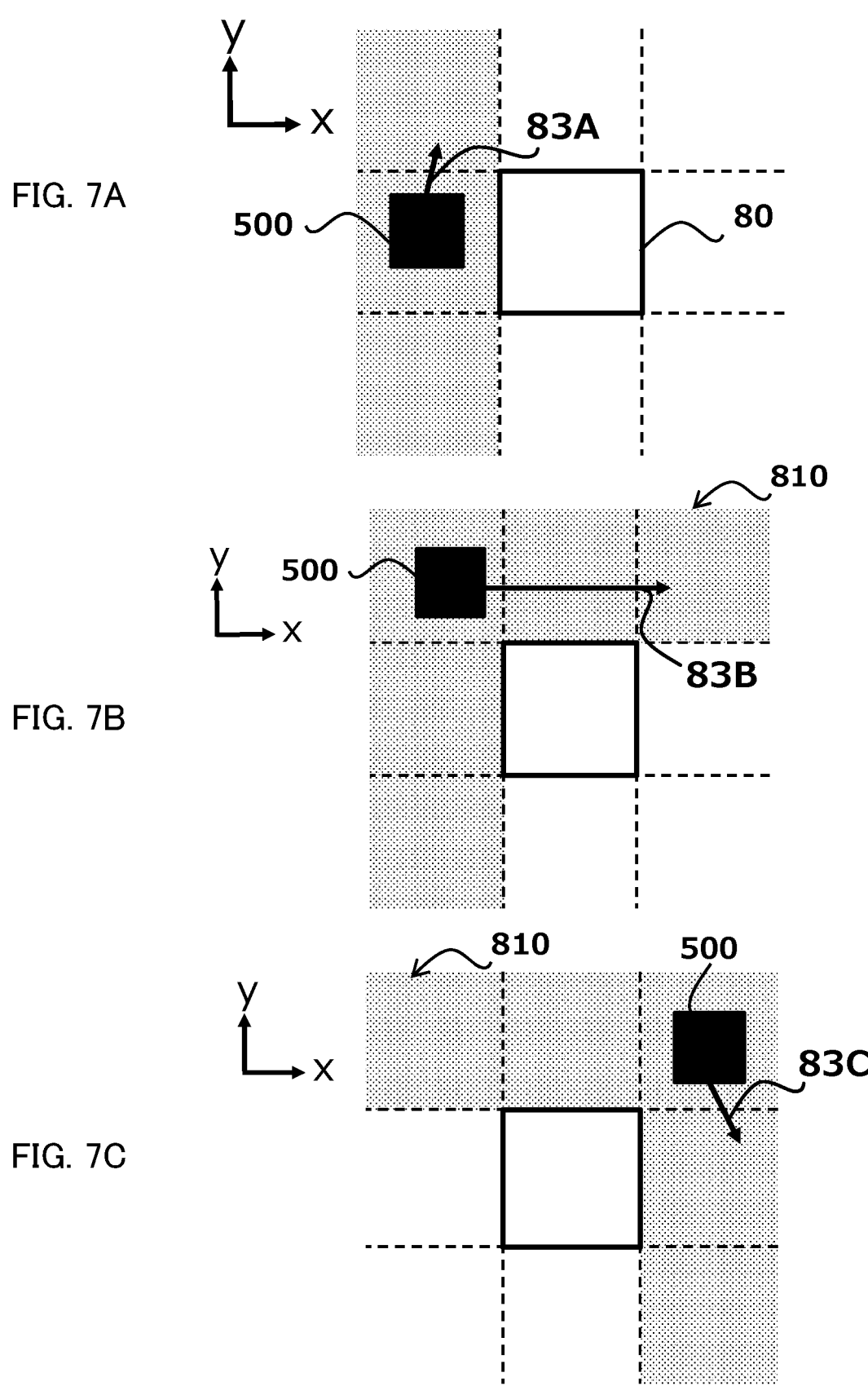
FIG. 7A is a first diagram illustrating switching of the movable region as an end effector moves around the obstacle.
FIG. 7B is a second diagram illustrating the switching of the movable region as the end effector moves around the obstacle.
FIG. 7C is a third diagram illustrating the switching of the movable region as the end effector moves around the obstacle.

FIG. 7A to FIG. 7C illustrate examples of the x-y plan view which represent the switching of the movable region as an end effector 500 moves around an obstacle. As depicted in FIG. 7A, the end effector 500 is located inside one movable region 810. In FIG. 7A, as the end effector 500 moves inside this movable region 810 in a direction indicated by an arrow 83A, the end effector 500 is positioned inside two movable regions 810, and reaches a state depicted in FIG. 7B. After that, in a state in FIG. 7B, when the end effector 500 moves a newly positioned movable region 810 in a direction of an arrow 83B, the end effector 500 locates inside two movable regions 810 different from those before moving. Thereafter, the end effector 500 leads to the state depicted in FIG. 7C. Next, the end effector 500 further moves in a direction of an arrow 83C.

Accordingly, it is possible for the collision avoidance object (the end effector 500 in the examples of FIG. 7A to FIG. 7C) to move while avoiding collisions with the collision avoidance necessary target (the obstacle 50 in the example of FIG. 7A to FIG. 7C), by switching the movable region. However, it is necessary that the collision avoidance object is located in at least one or more movable regions at two successive time steps before and after the switching of the movable region.

Next, each of the constraint conditions concerning the movable region will be described. The constraint condition that "the end effector is located in the movable region around the obstacle" is represented by an expression 39 and an expression 40.

[Math 32]

$$p_{i,t}^{ee} \geq p_{l,r,i}^{obs,rgn,min} \phi_{l,r,t}^{ee,obs} + p_i^{ee,min}\left(\neg \phi_{l,r,t}^{ee,obs}\right) \forall l, i, r, t \tag{39}$$

$$p_{i,t}^{ee} \geq p_{l,r,i}^{obs,rgn,max} \phi_{l,r,t}^{ee,obs} + p_i^{ee,max}\left(\neg \phi_{l,r,t}^{ee,obs}\right) \forall l, i, r, t \tag{40}$$

A constraint condition that "the end effector is located in the movable region around the transport object" is represented by an expression 41 and an expression 42.

[Math 33]

$$p_{m,i,t}^{dlv} \geq p_{l,r,i}^{obs,rgn,min} \phi_{m,l,r,t}^{dlv,obs} + p_{m,i}^{dlv,min}\left(\neg \phi_{m,l,r,t}^{dlv,obs}\right) \forall m, l, i, r, t \tag{41}$$

$$p_{m,i,t}^{dlv} \leq p_{l,r,i}^{obs,rgn,max} \phi_{m,l,r,t}^{dlv,obs} + p_{m,i}^{dlv,max}\left(\neg \phi_{m,l,r,t}^{dlv,obs}\right) \forall m, l, i, r, t \tag{42}$$

A constraint condition that "the transport object is located in the movable region around the obstacle" is represented by an expression (43) and an expression (44).

[Math 34]

$$p_{i,t}^{ee} - \left(p_{m,i,t}^{dlv} - p_{m,i,0}^{dlv}\right) \geq p_{i,r,\lambda}^{dlv,rgn,min} \phi_{m,r,t}^{ee,dlv} + \left(p_i^{ee,min} - \left(p_{m,i}^{dlv,max} - p_{m,i,0}^{dlv}\right)\right)\left(\neg \phi_{m,r,t}^{ee,dlv}\right) \forall m, i, r, t \tag{43}$$

[Math 35]

$$p_{i,t}^{ee} - \left(p_{m,i,t}^{dlv} - p_{m,i,0}^{dlv}\right) \leq p_{i,r,\lambda}^{dlv,rgn,max} \phi_{m,r,t}^{ee,dlv} + \left(p_i^{ee,max} - \left(p_{m,i}^{dlv,min} - p_{m,i,0}^{dlv}\right)\right)\left(\neg \phi_{m,r,t}^{ee,dlv}\right) \forall m, i, r, t \tag{44}$$

A constraint condition that "the transport object is located in the movable region around another transport object" is represented by an expression (45) and an expression (46).

[Math 36]

$$p_{m,i,t}^{dlv} - \left(p_{k,i,t}^{dlv} - p_{k,i,0}^{dlv}\right) \geq p_{k,r,1}^{dlv\ rgn\ min} \phi_{m,k,r,t}^{dlv\ dlv} + \left(p_{m,i}^{dlv,min} - \left(p_{k,i}^{dlv,max} - p_{k,i,0}^{dlv}\right)\right)\left(\neg \phi_{m,k,r,t}^{dlv\ dlv}\right) \forall m \neq k, i, r, t \tag{45}$$

[Math 37]

$$p_{m,i,t}^{dlv} - \left(p_{k,i,t}^{dlv} - p_{k,i,0}^{dlv}\right) \leq p_{k,r,1}^{dlv\ rgn\ min} \phi_{m,k,r,t}^{dlv\ dlv} + \left(p_{m,i}^{dlv,max} - \left(p_{k,i}^{dlv,min} - p_{k,i,0}^{dlv}\right)\right)\left(\neg \phi_{m,k,r,t}^{dlv\ dlv}\right) \forall m \neq k, i, r, t \tag{46}$$

A constraint condition the "the end effector is located inside one or more movable regions around at least one or more obstacles at successive two time steps" is represented by an expression (47).

[Math 38]

$$\bigvee_r \left(\phi_{l,r,t}^{ee,obs} \wedge \phi_{l,r,t-1}^{ee,obs}\right) = 1 \forall l, t > 0 \tag{47}$$

A constraint condition that "the end effector is located inside one or more movable regions around the transport object in successive two time steps" is represented by an expression (48).

[Math 39]

$$\bigvee_r \left( \phi^{ee,dlv}_{m,r,t} \wedge \phi^{ee,dlv}_{m,r,t-1} \right) = 1 \, \forall \, m, t > 0 \tag{48}$$

Note that, the above-described expression (47) and expression (48) correspond to constraint conditions that the robot and the transport object, which perform the pick-and-place with respect to one or more transport objects, are positioned inside the movable region which is a region not colliding with the collision avoidance necessary target, and correspond to an example of a "first condition" in the present disclosure.

Moreover, in the present example embodiment, when the transport object is in the carrying state, the movable region of the transport object is corresponded to that of the end effector for carrying. Accordingly, the motion plan unit 100 calculates the motion plan so as to make the decision variables $\varphi^{dlv,obs}$ and $\varphi^{dlv,dlv}$ continuous variables rather than binary variables, and to satisfy a constraint condition that "the transport object is located inside the moveable region around the collision avoidance necessary target". A constraint condition that "the transport object is located inside the movable region around the collision avoidance necessary target" is an example of a third condition in the present disclosure.

The following is a supplemental explanation regarding an effect of matching the movable region of the transport object to the movable region of the end effector carrying the transport object in a case where the object is in the carrying state. As a comparative example, it is possible to add constraint conditions similar to those in the expression (47) and the expression (48) (referred to as "constraint conditions on the comparative example".) for the movable region around the transport object and the obstacle and the movable region around movable regions of one transport object and another transport object, and to model the collision avoidances for these constraint conditions. On the other hand, since the decision variables $\varphi^{dlv,obs}$ and $\varphi^{dlv,dlv}$ are the binary variables, the number of the binary variables $\varphi^{dlv,obs}$ and $\varphi^{dlv,dlv}$ increases as the number of transport objects increases. In contrast, in the present example embodiment, by matching the movable regions of the transport object and the end effector carrying the transport object each other in response to the transport object that is in the carrying state, the decision variables $\varphi^{dlv,obs}$ and $\varphi^{dlv,dlv}$ can be defined to be continuous variables rather than the binary variables. Therefore, the object variables $\varphi^{dlv,obs}$ and $\varphi^{dlv,dlv}$ is made as a continuous variable instead of a binary variable. Accordingly, it is possible to make the number of the binary variables $\varphi^{dlv,obs}$ and $\varphi^{dlv,dlv}$, which normally increases as the number of transport objects increases, to be 0. The decision variables $\varphi^{dlv,obs}$ and $\varphi^{dlv,dlv}$ can be made the continuous variables since the binary values of the binary variables $\varphi^{dlv,obs}$ and $\varphi^{dlv,dlv}$ can be selectively propagated to the decision variable $\varphi^{dlv,obs}$ and $\varphi^{dlv,dlv}$ by the expression (49) and the expression (50), which correspond to constraint conditions to be described later.

Figure 8A:
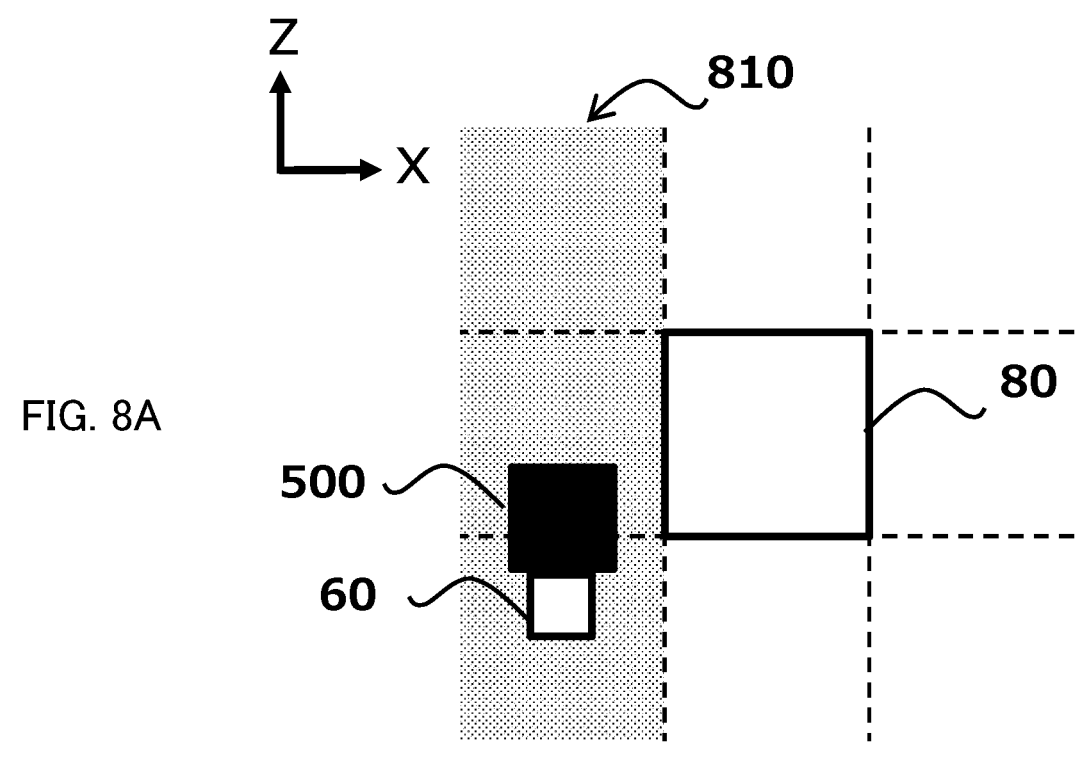
FIG. 8A is an x-z plan view of a region surrounding the obstacle with the end effector conveying a transport object.
Figure 8B:
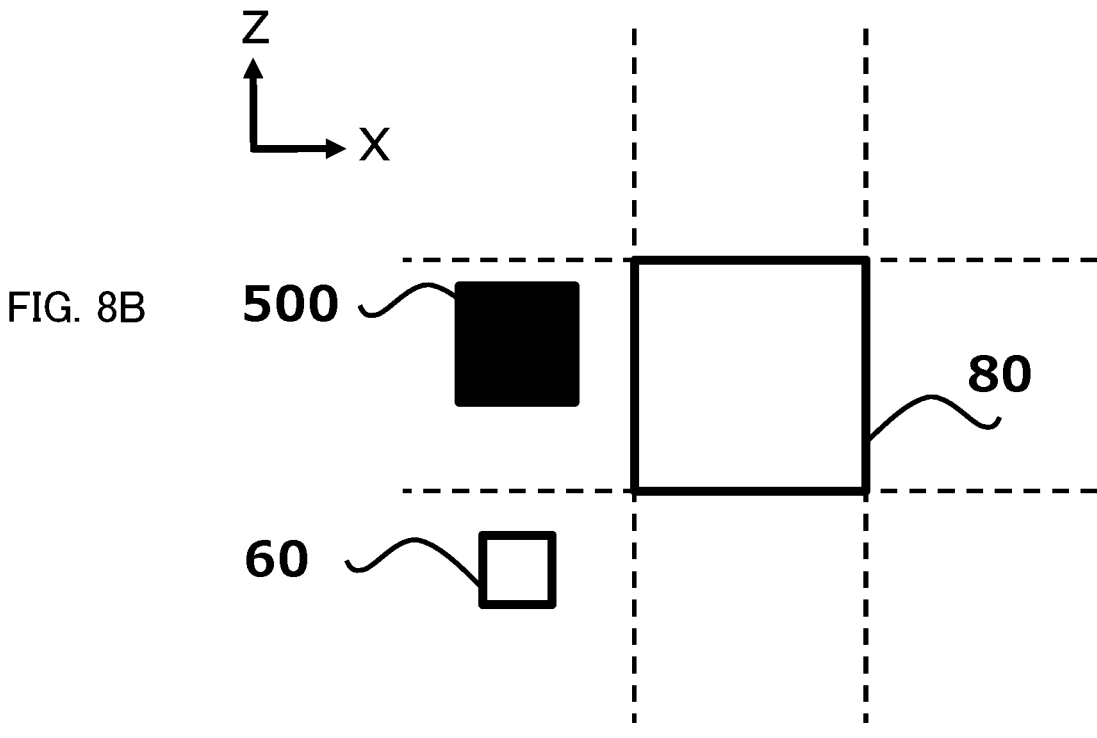
FIG. 8B is the x-z plan view of the region surrounding the obstacle with the end effector conveying the transport object.

With reference to FIG. 8A and FIG. 8B, the following is a more detailed explanation of the same movable region for the transport object and the end effector carrying the transport object when the object is in the carrying state. FIG. 8A is an x-z plan view of a periphery of the obstacle 80 in a condition where the end effector 500 is conveying a transport object 60, and FIG. 8B is an x-z plan view of the periphery of the obstacle 80 in a state where the end effector 501 is not carrying the transport object 60.

As depicted in FIG. 8A, the movable region 810 around the obstacle 80 of the transport object 60 matches to the movable region 810 around the obstacle 80 of the end effector 500 only in the carrying state. On the other hand, as depicted in FIG. 8B, when the transport object 60 is not in the carrying state, the determination concerning the movable region around the obstacle 80 need not be considered. This is because the collision may occur only when the transport object 60 is in the carrying state, and the transport object 60 exists in a position where the transport object 60 does not collide with another collision avoidance object before being picked and after being placed.

In view of the above, the motion plan unit 100 adds constraint conditions represented by the following expressions (49) and (50) as a condition corresponding to "the movable region 810 around the obstacle 80 of the transport object 60 matches the movable region 810 around the obstacle 80 of the end effector 500 only in the carrying state". On the other hand, since the motion plan unit 100 reflects a condition that "when the transport object 60 is not in the carrying state, it is not necessary to consider the determination of the movable region around the obstacle 80", the constraint condition according to the comparative example (that is, the constraint condition that the transport object is located inside the movable region around the collision avoidance necessary target) corresponding to the expression (47) and the expression (48) is unnecessary. In other words, in a case of calculating the motion plan, when the transport object is not conveyed by the robot (in this case, the end effector), the motion plan unit 100 skips an evaluation on the constraint condition that the transport object is positioned inside the movable region around the collision avoidance necessary target. According to this manner, the motion plan unit 100 can calculate the motion plan to satisfy the constraint condition that "the transport object is positioned inside the movable region around the collision avoidance necessary target".

Constraint conditions in the optimization model will be described again. A constraint condition that "the movable region around the obstacle of the transport object matches the movable region around the obstacle of the end effector, in the carrying state" is represented by an expression (49).

[Math 40]

$$\phi^{dlv,obs}_{m,l,r,t} = \phi^{ee,obs}_{l,r,t} \wedge \theta^{cry}_{m,t} \; \forall \, m, l, r, t \tag{49}$$

A constraint condition that "the movable region around another transport object of the transport object matches the movable region around another transport object of the end effector, in the carrying state" is represented by an expression (50).

[Math 41]

$$\phi^{dlv,dlv}_{m,k,r,t} = \phi^{ee,dlv}_{k,r,t} \wedge \theta^{cry}_{m,t} \; \forall \, m \neq k, r, t \tag{50}$$

21
22

The expression (49) and the expression (50) correspond to the constraint condition that the movable region around the collision avoidance necessary target of the robot and the movable region around the collision avoidance necessary target of the transport object being carried match with each other while the robot is grasping and carrying the transport object, and are examples of a "second condition" in the present disclosure.

A constraint condition that "the transport object cannot be positioned in the movable region around the transport object itself" is represented by an expression (51).

[Math 42]

$$\phi_{m,m,r,t}^{dlv,dlv} = 0 \ \forall \ m, r, t \tag{51}$$

A constraint condition for converting the velocity of the end effector into a absolute value is represented by an expression (52) and an expression (53). More precisely, a minimization of an absolute value ($|v^{ee}|$) of $v^{ee}$ in the objective function is realized by a combination of the minimization of $v^{ee}$ and the constraint condition represented by the expression (52) and the expression (53).

[Math 43]

$$v_{i,t}^{ee} \geq -v_{i,t}^{ee} \ \forall \ i, t \tag{52}$$

$$v_{i,t}^{ee} \leq v_{i,t}^{ee} \ \forall \ i, t \tag{53}$$

Values of distances $b^{on}$ and $b^{off}$ between the end effector and the transport object in a grasping action can be specified by an expression (54) and an expression (55), respectively.

[Math 44]

$$b_{m,i}^{on} = \begin{cases} 0 & i < N_{dim} \\ \frac{1}{2}\left(s_i^{ee} + s_{m,i}^{dlv}\right) & i = N_{dim} \end{cases} \forall \ m \tag{54}$$

$$b_{m,i}^{off} = \begin{cases} 0 & i < N_{dim} \\ b_{m,i}^{on} + d_m^{mgn} & i = N_{dim} \end{cases} \forall \ m \tag{55}$$

Here, "$i=N_{dim}$" corresponds to a z component, and "$i<N_{dim}$" corresponds to x and y components. That is, a distance between respective centers of gravity positions of the end effector and the transport object in the grasping action attains 0 in the x and y components, and indicates, in the z component, a size in which the end effector and the transport object are in close contact with each other, or a size in which the end effector and the transport object are in close contact with each other plus a margin.

The objective function is represented by an expression (56).

[Math 45]

$$X*= \underset{X}{\operatorname{argmin}}\left(\frac{1}{N_{stp}+1}\sum_t(\neg C_t) + \varepsilon\sum_t\sum_i v_{i,t}^{ee}\right) \tag{56}$$

s.t. Expression (1) to expression (53)

Here, a first term of the expression (56) corresponds to a normalized value so that the number of time steps (necessary time length) required for the pick-and-place to be in the completion state is in a value range of 0 to 1: closer to 0 corresponds to an earlier completion state and closer to 1 corresponds to a later completion state. A second term corresponds to a total movement in a sense of a L1 norm of the end effector. By making a weighting coefficient $\varepsilon$ of the second term a sufficiently small positive real number, the first term and the second term of the objective function can be prioritized for minimization in that order.

The above is an example of a definition of the optimization model. The motion plan unit 100 generates the above-described optimization model, and performs a calculation of a seeking solution for the optimization model to obtain a solution X* (for instance, an optimum solution) with respect to a vector X having all decision variables as elements. In the following, the decision variables that are the elements of the solution X* are denoted with "*". The above is an example of a calculation method of the motion plan information by the motion plan unit 100.

Next, the motion plan information will be described. The motion plan unit 100 extracts the motion plan information from the solution X*. Specifically, among solutions X*, $p^{ee}*$ is extracted as the trajectory information, and $\theta^{pck}*$, $\theta^{plc}*$, and $\theta^{cry}*$ are extracted as the action information, and these are combined and outputted as the motion plan information. The fact that "$\vee\theta^{pck}*$" is 1 corresponds to the end effector starting to grasp and picking up the transport object at the time step. The fact that "$\vee\theta^{plc}*$" is 1 corresponds to the end effector terminating the grasping action and placing the transport object in the time step. The fact that "$\vee\theta^{plc}*$" is 1 corresponds to the end effector moving while grasping the transport object, that is, carrying transport object, at the time step.

Next, the plan setting information will be described. The setting storage unit 300 stores the plan setting information. In particular, the plan setting information indicates the constants and the coefficients described above, except for the number $N_{dlv}$ of transport objects and $p^{dlv,init}$. These values of the constants and coefficients may be separated into values set by a user and values automatically calculated by the setting storage unit 300. For instance, for constants and coefficients such as the number $N_{dim}$ of dimensions and $v^{ee,init}$, for which explicit default values (3 and 0, respectively) exist, the user may skip setting them. In addition, the distance $b^{on}$ and the distance $b^{off}$ may be calculated by the expression (54) and the expression (55), respectively, and for constants and coefficients such as M, $\varepsilon$, and the like, the setting storage unit 300 may calculate an appropriate value using other constants and coefficients.

The following is a supplemental explanation regarding the measurement information. The motion plan unit 100 acquires measurement information which is obtained by combining the position information and the posture information of the transport object which are output by the measurement device 40. The motion plan unit 100 specifies the number of transport objects from the acquired measurement information and determines the number $N_{dim}$ of dimensions, while determining a correspondence between the measurement information and the index numbers m and k. Moreover, the motion plan unit 100 reads the position information as $p^{dlv,init}$ from the acquired measurement information. Furthermore, the motion plan unit 100 may update a value of $s^{dlv}$ read from the setting storage unit 300 by using the posture information in the acquired measurement information.

Figure 9:
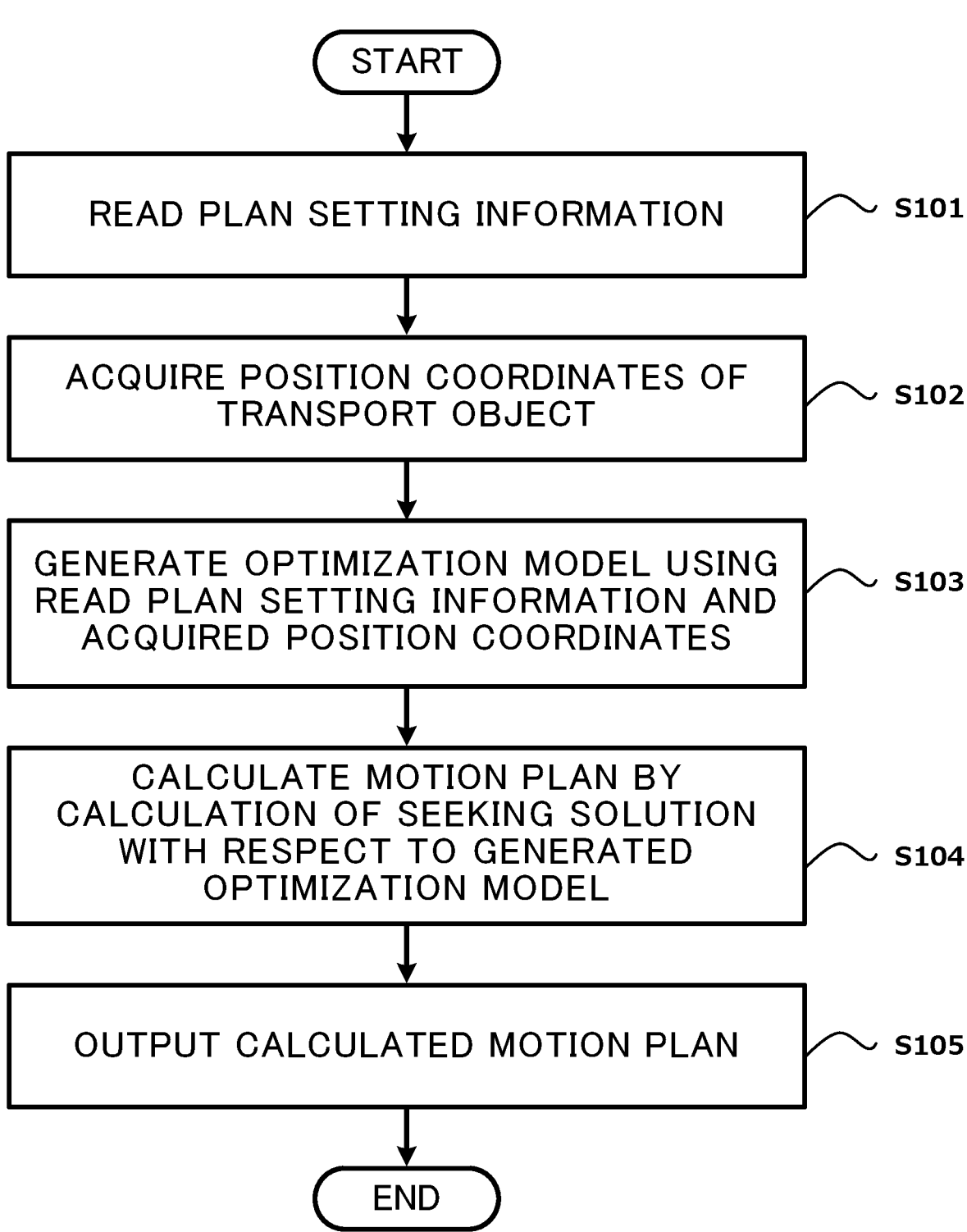
FIG. 9 is a flowchart for explaining an example for process steps of a motion plan according to the first example embodiment.

The motion plan unit 100 executes calculation in accordance with steps depicted in FIG. 9. FIG. 9 is a flowchart illustrating an example of a process of the motion plan unit 100.

The motion plan unit 100 reads the plan setting information from the setting storage unit 300 (step S101). Accordingly, the motion plan unit 100 acquires the constant conditions and the coefficients (excluding $N_{dlv}$ and $p^{dlv,init}$) described in (b) Constants and coefficients: Numbers, (c) Constants and coefficients: Initial values and target value, (d) Constants and coefficients: Maximum value and minimum value, (e) Constants and coefficients: Shape, (f) Constant/coefficient: Distance, (g) Constants and coefficients: Others, for instance.

Next, the motion plan unit 100 acquires position coordinates of the transport object from the measurement device 40 (step S102). Accordingly, the motion plan unit 100 acquires, for instance, the initial value $p^{dlv,init}$ of the number $N_{dlv}$ of transport objects and the position of the transport objects.

Next, the motion plan unit 100 generates an optimization model using the read plan setting information and the acquired position coordinates of the transport object (step S103). For instance, the motion plan unit 100 generates the optimization model related to the vector X of the decision variable represented in the expression (56) using the constraint conditions represented in the expression (1) to the expression (53).

Next, the motion plan unit 100 performs the calculation of the seeking solution with respect to the generated optimization model, and calculates the motion plan information based on the obtained solution (step S104). In this case, the motion plan unit 100 obtains the solution X* of the vector X being the decision variable which is to be a solution of the optimization model represented in the expression (56), and extracts $p^{ee}*$ corresponding to the trajectory information, and $\theta^{pck}*$, $\theta^{plc}*$, and $\theta^{cry}*$ corresponding to the action information from the obtained solution X*, as the motion plan information.

The motion plan unit 100 outputs the calculated motion plan information (step S105). Next, the motion plan unit 100 terminates the process depicted in FIG. 9, after a process in step S105 is executed.

As described above, the motion plan device of the present example embodiment sets the first condition in which the robot performing the pick-and-place for one or more transport objects and the transport objects are located inside the movable regions each being the region where no collision with the collision avoidance necessary target occurs, and the second condition in which, while the robot is grasping and carrying the transport object, the movable region around the collision avoidance necessary target of the robot and the movable region around the collision avoidance necessary target of the transport object being carried match with each other. Next, the motion plan device calculates the motion plan of the robot based on the first condition and the second condition. As a result, it is possible for the motion plan device according to the present example embodiment to calculate the motion plan of the pick-and-place with high time efficiency due to consideration with the collision avoidance.

Second Example Embodiment

In the first example embodiment, the main object is to reduce the number of binary variables; however, in the second example embodiment, the main object is to substantially reduce the number of constraint conditions according to the big-M method. In particular, it is aimed to substantially reduce the number of constraint conditions represented in the expression (43) and the expression (44) (that is, constraint conditions which may determine whether or not the transport object is located in the movable region around the obstacle).

A system configuration of the robot control system including the motion plan device and the motion plan device in the second example embodiment is the same as the system configurations of the robot control systems 1, 1$a$, and 1$b$ described with reference to FIG. 1 to FIG. 3 in the first example embodiment. A hardware configuration of the robot control system in the second example embodiment is also the same as the hardware configuration described with reference to FIG. 5 in the first example embodiment. Moreover, the hardware configuration of the motion plan device according to the second example embodiment is the same as that described with reference to FIG. 4 in the first example embodiment. Furthermore, the optimization model used in the second example embodiment is the same as that in the first example embodiment. Hereafter, the same reference numerals denote the same elements as those in the first example embodiment, and explanations thereof will be omitted as appropriate.

In the second example embodiment, the number of constraint conditions represented by the expression (43) and the expression (44) is substantially reduced by softly restricting possible values of the decision variables $\varphi^{ee,dlv}$. This corresponds to removing the expression (43) and the expression (44) to the extent that there is no problem in terms of the collision avoidance. In detail, in the second example embodiment, the optimization model represented in an expression (57) below is set.

[Math 46]

$$X\ast= \underset{X}{\operatorname{argmin}} \left( \frac{1}{N_{stp}+1}\sum_t (\neg\, C_t) + \varepsilon \sum_t \sum_i v_{i,t}^{ee} + \sum_m \sum_t \sum_{r\in R_c} \phi_{m,r,t}^{ee,dlv} \right) \quad (57)$$

s.t. Expression (1) to expression (53)

The objective function represented in the expression (57) is different from the objective function represented in the expression (56) described in the first example embodiment in that a third term is included.

The third term of the objective function represented in the expression 57 is referred to as a "soft path constraint". In addition, "Rc" denotes a set of index numbers of movable regions which are penalized for being used as the path of the robot, and is referred to as a "constraint path". The soft path constraint works to minimize as much as possible the penalty caused by the movable region where the robot is located, that is, to set as many $\varphi^{ee,dlv}$ as possible to zero, in order to minimize the objective function. That is, for the movable region belonging to the constraint path Rc, it is possible to practically skip evaluations of the expressions (43) and (44) in a case where values of $\varphi^{ee,dlv}$ are determined by the soft path constraint. This corresponds to substantially reducing the number of constraint conditions according to the big-M method.

The soft path constraint corresponds to preferentially selecting a path to avoid passing through the movable region which belongs to the constraint path Rc, as much as possible. Therefore, by regarding the movable regions which are predicted to be less likely to pass through as elements of the constraint path Rc, it is possible to efficiently achieve a reduction effect of the constraint conditions described above.

Note that it is also conceivable that the constraint condition "$\varphi^{ee,dlv}=0$" is set to forcibly avoid passing through the movable region which belongs to the constraint path Rc. However, in general, since there are many paths in which the end effector moves around the obstacle and the transport object, and the paths have a complicated dependence, it is difficult to specify each movable region which is not likely to pass through at all, or constraint conditions are conservatively given only for a small number of movable regions. For this reason, the method using the constraint condition "$\varphi^{ee,dlv}=0$" is unlikely to be effective in efficiently determining values of $\varphi^{ee,dlv}$. On the other hand, the method with the soft path constraint is effective in determining the values of $\varphi^{ee,dlv}$ in a practical manner, because the method does not need to specify in advance the movable region which has absolutely no chance of being passed through at all.

The calculation method of the constraint path Rc will be described with reference to FIG. 5, and FIG. 10A and FIG. 10B. FIG. 10A is an example of an x-z plan view of the movable region (that is, the constraint path Rc) subject to the soft path constraint, and FIG. 10B is an x-y plan view corresponding to that in FIG. 10A. In FIG. 10A and FIG. 10B, the movable region corresponding to the constraint path Rc is hatched.

As a characteristic of the action of the pick-and-place, the end effector has a high probability (prediction passage probability) of moving in the movable region above the transport object, and on the contrary, has a low probability (prediction passage probability) of moving in the movable region below the transport object. Therefore, in the example embodiment illustrated in FIG. 10A, the movable region below the transport object 60 (that is, below the transport object 60 in the z direction) is the constraint path Rc.

As another characteristic of the action of the pick-and-place, the end effector moves along a path from an initial position (source) to a target position (destination) of the transport object, but the travel distance in either the x direction or the y direction is often longer than the travel distance in another axial direction. The example in FIG. 5 depicts a case where the travel distance in the x direction is longer than the travel distance in the y direction. In many cases, the end effector can complete a series of the pick-and-place actions by passing through the movable regions at both sides in the axial direction (the x direction in the example of FIG. 5) where the movable distance above the transport object is long, without passing through the movable regions at both sides in an axial direction (the y-direction in the example in FIG. 5) where the travel distance is short.

These characteristics of the pick-and-place can be used to calculate the constraint path Rc. Specifically, the motion plan unit 100 adds a movable region located at a lower side than the transport object 60 in the z-direction to the constraint path (see FIG. 10A). Subsequently, the motion plan unit 100 adds the movable regions located at both sides of the transport object 60 in an axial direction with a short travel distance (the y direction in the examples in FIG. 10A and FIG. 10B) (see FIG. 10B). In a case of determining an axis with a short movement distance, for instance, the motion plan unit 100 calculates respective centers of initial positions and target positions of a plurality of transport objects, and compares in difference an absolute value of an x component with an absolute value of a y component, and sets an axis with a smaller value as the axis with the shorter travel distance.

The calculation method of the constraint path Rc is not limited to the examples described with reference to FIG. 10A and FIG. 10B, but may be a calculation method of the movable region which is unlikely to be passed through using the plan setting information and the measurement information based on a prediction. In detail, the motion plan unit 100 sets, as the constraint path Rc, the movable region in which the prediction passage probability of the robots is predicted to be lower than a threshold value based on the initial positions and the target positions of the transport objects.

Moreover, in the examples described with reference to FIG. 10A and FIG. 10B, the constraint path Rc is shared in all the transport objects and in all the time steps, but the constraint path Rc may be different for each transport object and for each time step. In this case, the constraint path Rc has m and t as variables such as the constraint path Rc(m,t) and is determined more precisely, and as a result, an effect is that more values of $\varphi^{ee,dlv}$ can be determined by soft path constraint condition.

In a preferred example, the values of $\varphi^{ee,dlv}$ in the soft path constraint may further be multiplied by weight coefficients to more efficiently determine the values of $\varphi^{ee,dlv}$. The weight coefficients may be calculated based on a probability of being passed through the movable region or the like.

Figure 11:
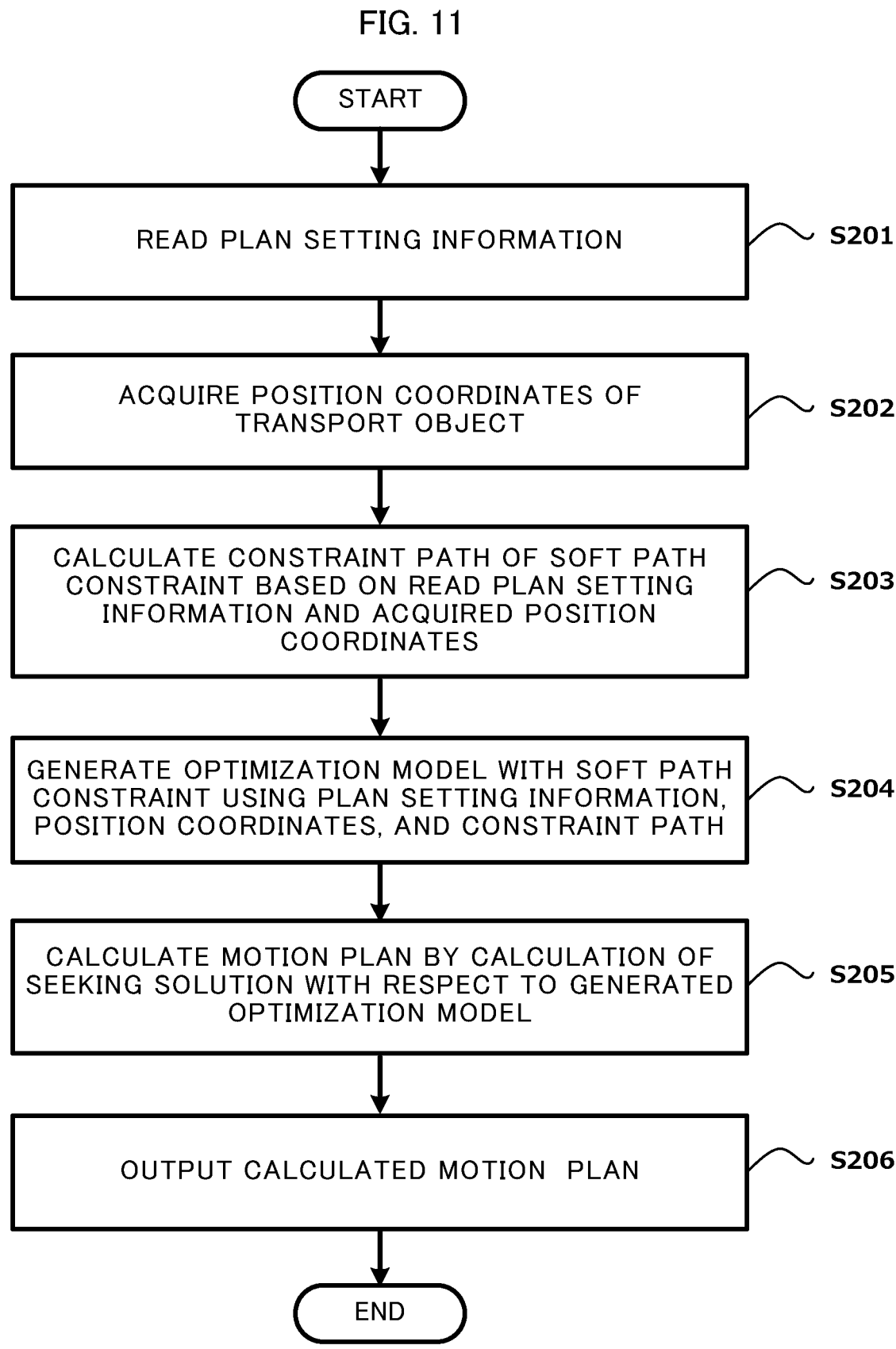
FIG. 11 is a flowchart for explaining an example for process steps of the motion plan according to the second example embodiment.

FIG. 11 is a flowchart illustrating an example for process steps of the motion plan unit 100 according to the second example embodiment.

The motion plan unit 100 reads the plan setting information from the setting storage unit 300 (step S201). The motion plan unit 100 acquires the position coordinates of the transport object from the measurement device 40 (step S202). Processes of step S201 and step S202 are the same as the step S101 and step S102 of the flowchart depicted in FIG. 9.

The motion plan unit 100 calculates the constraint path Rc using the read planning setting information and the acquired position coordinates of the transport object (step S203). For instance, the motion plan unit 100 adds, to the constraint path Rc, the movable region on the lower side in the z axis direction and the movable regions at both sides in the axial direction where the travel distance is shorter.

Next, the motion plan unit 100 generates the optimization model with the soft path constraint by using the read plan setting information, the acquired position coordinates of the transport object, and the calculated constraint path Rc (step S204). Specifically, the motion plan unit 100 generates an optimization model related to the vector X of the decision variable represented in the expression (57) using the constraint conditions represented in the expression (1) to the expression (53).

The motion plan unit 100 performs the calculation of the seeking solution with respect to the generated optimization model, and calculates the motion plan information from the obtained solution (step S205). In this case, for instance, the motion plan unit 100 finds the solution X* of the vector X, which is a solution of the optimization model represented in the expression (57), and extracts $p^{ee}*$ corresponding to the trajectory information and $\theta^{pck}*$, $\theta^{plc}*$, and $\theta^{cry}*$ corresponding to the action information from the obtained solution X* as the motion plan information.

The motion plan unit 100 outputs the calculated motion plan information (step S206). After a process of step S206 is executed, the motion plan unit 100 terminates the process depicted in FIG. 10.

As described above, the motion plan device 10 according to the second example embodiment sets the movable region around the transport object, where the prediction passage probability of the robot is lower than the threshold value, as the constraint path which is penalized for being the path of the robot, based on the initial position and the target position of each transport object. Next, the motion plan device 10 calculates the motion plan of the robot based on the set constraint conditions and the constraint path. As a result, it is possible for the motion plan device according to the present example embodiment to calculate the motion plan of the pick-and-place having high time efficiency in consideration of the collision avoidance.

Third Example Embodiment

Figure 12:
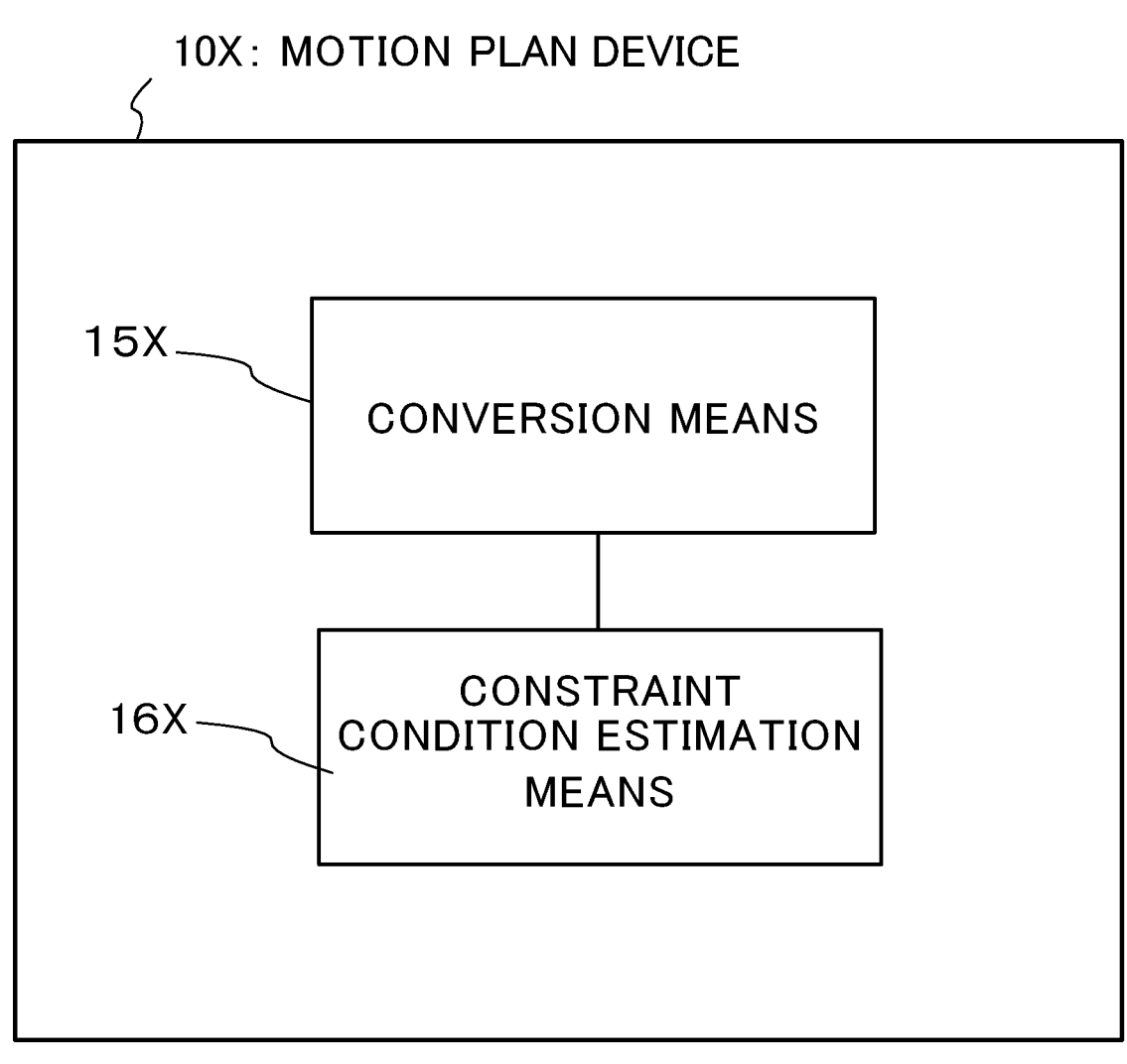
FIG. 12 illustrates a schematic configuration diagram of an motion plan device according to a third example embodiment.

FIG. 12 illustrates a schematic configuration of a motion plan device 10X according to a third example embodiment. The motion plan device 10X mainly includes a condition setting means 90X and a motion plan means 100X. Note that the motion plan device 10X may be formed by a plurality of devices. The motion plan device 10X may be, for instance, one of the motion plan devices 10, 10a, and 10b in the first example embodiment and the second example embodiment.

The condition setting means 90X sets the first condition in which the robot performing the pick-and-place for one or more transport objects and the transport objects are located inside the movable regions each being the region where no collision with the collision avoidance necessary target occurs, and the second condition in which, while the robot is grasping and carrying the transport object, the movable region around the collision avoidance necessary target of the robot and the movable region around the collision avoidance necessary target of the transport object being carried match with each other. The motion plan means 100X calculates the motion plan of the robots based on the first condition and the second condition. The condition setting means 90X and the motion plan means 100X correspond to an example of the motion plan means 100 according to the first example embodiment and the second example embodiment.

Figure 13:
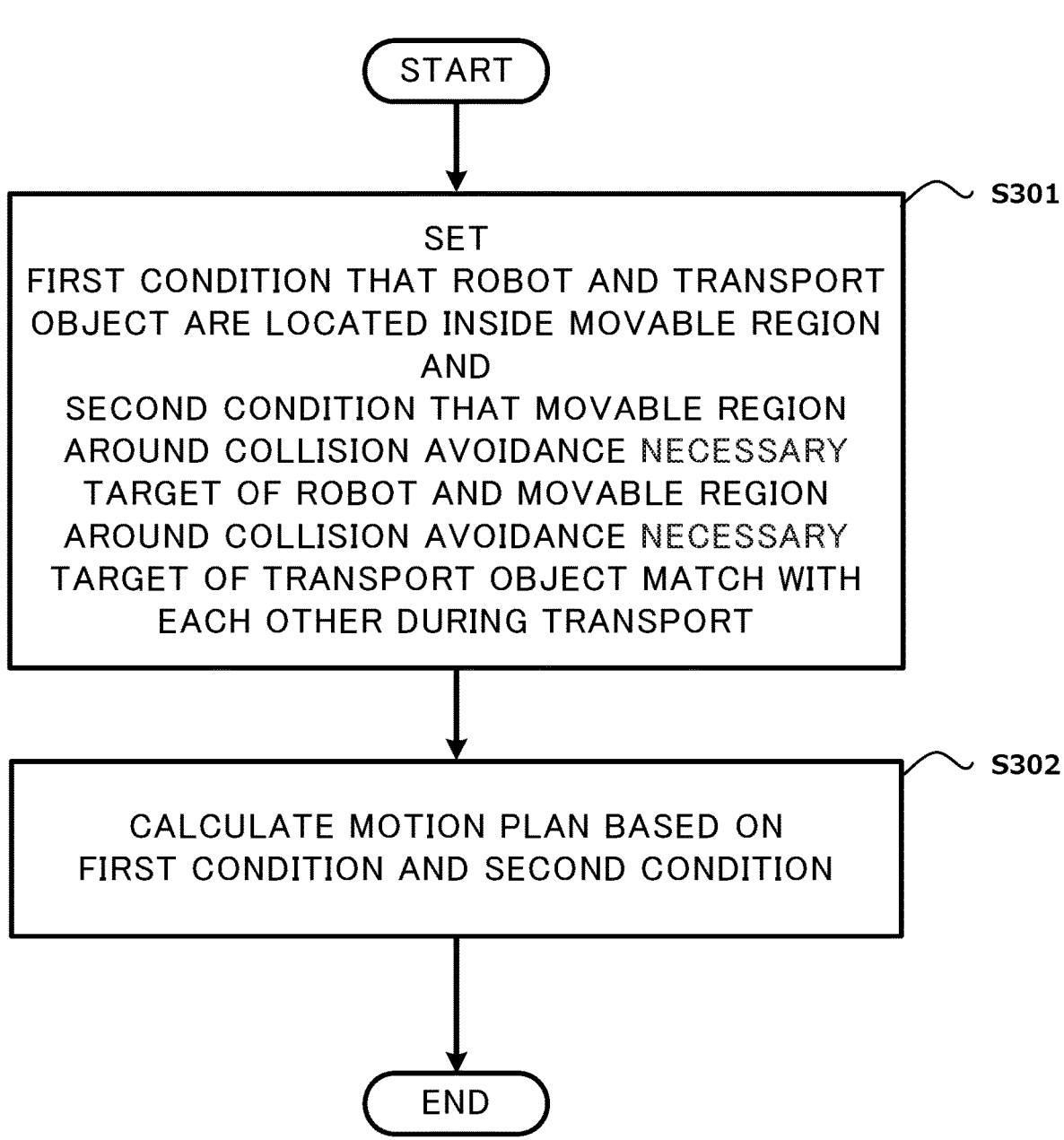
FIG. 13 is a flowchart for explaining and example for process steps of a motion plan according to the third example embodiment.

FIG. 13 illustrates an example of a flowchart which is executed by the motion plan device 10X in the third example embodiment. The condition setting means 90X sets the first condition in which the robot performing the pick-and-place for one or more transport objects and the transport objects are located inside the movable regions each being the region where no collision with the collision avoidance necessary target occurs, and the second condition in which, while the robot is grasping and carrying the transport object, the movable region around the collision avoidance necessary target of the robot and the movable region around the collision avoidance necessary target of the transport object being carried match with each other (step S301). After that, the motion plan means 100X calculates the motion plan of the robots based on the first condition and the second condition (step S302).

According to the third example embodiment, it is possible for the motion plan device 10X to preferably calculate the motion plan having high time efficient, in which the pick-and-place in consideration of the collision avoidance.

In the example embodiments described above, the program is stored by any type of a non-transitory computer-readable medium (non-transitory computer readable medium) and can be supplied to a processor or the like that is a computer. The non-transitory computer-readable medium include any type of a tangible storage medium. Examples of the non-transitory computer readable medium include a magnetic storage medium (that is, a flexible disk, a magnetic tape, a hard disk drive), a magnetic-optical storage medium (that is, a magnetic optical disk), a CD-ROM (Read Only Memory), a CD-R, a CD-R/W, a solid-state memory (that is, a mask ROM, a PROM (Programmable ROM), an EPROM (Erasable PROM), a flash ROM, a RAM (Random Access Memory)). The program may also be provided to the computer by any type of a transitory computer readable medium. Examples of the transitory computer readable medium include an electrical signal, an optical signal, and an electromagnetic wave. The transitory computer readable medium can provide the program to the computer through a wired channel such as wires and optical fibers or a wireless channel.

While the present disclosure has been described with reference to the example embodiments, the present invention is not limited to the above example embodiments. Various modifications that can be understood by a person skilled in the art within the scope of the present invention can be made to the configuration and details of the present disclosure. In addition, each disclosure of the above-mentioned non-patent documents and the like cited are incorporated by reference in this document.

DESCRIPTION OF SYMBOLS 1, 1a, 1b Robot control system
10, 10a, 10b Motion plan device
20 Control device
30 Setting storage device
40 Measurement device
50 Robot

What is claimed is:

1. A motion plan device comprising:
a memory storing instructions; and
one or more processors configured to execute the instructions to:
set a first condition in which a robot performing a pick-and-place for one or more transport objects and the one or more transport objects are located inside movable region being a region where no collision with a collision avoidance necessary target occurs, and a second condition in which, while the robot is grasping and carrying the transport object, the movable region around the collision avoidance necessary target of the robot and the movable region around the collision avoidance necessary target of the transport object being carried match with each other;
calculate a motion plan of the robot based on the first condition and the second condition; and
control the motion plan to be transmitted to the robot to control the robot to realize the motion plan,
wherein the first condition includes a third condition that the transport object is located inside the movable region around the collision avoidance necessary target, and
wherein the processor is further configured to execute the instructions to skip an evaluation concerning the third condition while the transport object is not being transported when calculating the motion plan.
2. The motion plan device according to claim 1, wherein the processor is further configured to execute the instructions to set, as a constraint path which is penalized for being used as a path of the robot, the movable region around the transport object where a prediction passage probability for the robot is lower than a threshold value based on an initial position and a target position of each of the transport objects, wherein the processor calculates the motion plan based on a condition set by the processor and the constraint path.

3. The motion plan device according to claim 2, wherein the processor is further configured to execute the instructions to set a movable region positioned below the transport object in the constraint path.

4. The motion plan device according to claim 2, wherein the processor is further configured to execute the instructions to set, in the constraint path, a movable region positioned at both sides of the transport object in an axial direction of a coordinate axis with a shorter distance between the initial position and the target position in two coordinate axes corresponding to a horizontal plane.

5. The motion plan device according to claim 1, wherein the processor is further configured to execute the instructions to generate, as the motion plan, trajectory information concerning the robot and action information concerning an action of the robot.

6. The motion plan device according to claim 1, wherein the processor is further configured to execute the instructions to output, as the motion plan, a solution of an optimization model based on constraint conditions including the first condition and the second condition and an objective function concerning at least one of the number of time steps to complete the pick-and-place or a distance traveled by the robot.

7. The motion plan device according to claim 1, wherein the robot includes an end effector, and the processor is further configured to execute the instructions to consider the end effector as a portion of the robot, and determine the first condition and the second condition.

8. A motion plan method comprising:

setting a first condition in which a robot performing a pick-and-place for one or more transport objects and the one or more transport objects are located inside movable region being a region where no collision with a collision avoidance necessary target occurs, and a second condition in which, while the robot is grasping and carrying the transport object, the movable region around the collision avoidance necessary target of the robot and the movable region around the collision avoidance necessary target of the transport object being carried match with each other;

calculating a motion plan of the robot based on the first condition and the second condition; and controlling the motion plan to be transmitted to the robot to control the robot to realize the motion plan, wherein the first condition includes a third condition that the transport object is located inside the movable region around the collision avoidance necessary target, and wherein the method further comprises skipping an evaluation concerning the third condition while the transport object is not being transported when calculating the motion plan.

9. A non-transitory computer-readable recording medium storing a program, the program causing a computer to perform a process comprising:

setting a first condition in which a robot performing a pick-and-place for one or more transport objects and the one or more transport objects are located inside movable region being a region where no collision with a collision avoidance necessary target occurs, and a second condition in which, while the robot is grasping and carrying the transport object, the movable region around the collision avoidance necessary target of the robot and the movable region around the collision avoidance necessary target of the transport object being carried match with each other;

calculating a motion plan of the robot based on the first condition and the second condition; and controlling the motion plan to be transmitted to the robot to control the robot to realize the motion plan, wherein the first condition includes a third condition that the transport object is located inside the movable region around the collision avoidance necessary target, and wherein the program causing the computer to perform skipping an evaluation concerning the third condition while the transport object is not being transported when calculating the motion plan.

* * * * *